US011068971B1

(12) United States Patent
Kantamneni et al.

(10) Patent No.: US 11,068,971 B1
(45) Date of Patent: Jul. 20, 2021

(54) METHOD, MEDIUM, AND SYSTEM FOR VIRTUAL TRY-ON COORDINATION VIA COMMUNICATIONS SESSIONS

(71) Applicant: Mirelz Inc., Plano, TX (US)

(72) Inventors: Harish Kantamneni, Plano, TX (US); Pratima Adusumilli, Plano, TX (US)

(73) Assignee: MIRELZ INC., Plano, TX (US)

( * ) Notice: Subject to any disclaimer, the term of this patent is extended or adjusted under 35 U.S.C. 154(b) by 23 days.

(21) Appl. No.: 16/731,789

(22) Filed: Dec. 31, 2019

Related U.S. Application Data

(60) Provisional application No. 62/786,728, filed on Dec. 31, 2018.

(51) Int. Cl.
| | |
|---|---|
| *G06Q 30/00* | (2012.01) |
| *G06Q 30/06* | (2012.01) |
| *G06F 3/0482* | (2013.01) |
| *H04L 29/06* | (2006.01) |

(52) U.S. Cl.
CPC ....... *G06Q 30/0643* (2013.01); *G06F 3/0482* (2013.01); *G06Q 30/0613* (2013.01); *G06Q 30/0629* (2013.01); *G06Q 30/0631* (2013.01); *H04L 65/1069* (2013.01); *H04L 67/38* (2013.01)

(58) Field of Classification Search
CPC ........... G06Q 30/0643; G06Q 30/0613; G06Q 30/0629; G06Q 30/0631; G06F 3/0482; H04L 65/1069; H04L 67/38
See application file for complete search history.

(56) References Cited

U.S. PATENT DOCUMENTS

| | | | | |
|---|---|---|---|---|
| 6,624,843 B2* | 9/2003 | Lennon | ............... | G06Q 30/02 |
| 7,133,839 B2* | 11/2006 | Inoue | ............... | G06Q 10/087 |
| | | | | 705/27.2 |
| 8,606,645 B1* | 12/2013 | Applefeld | ............... | G06Q 30/02 |
| | | | | 705/26.1 |
| 9,646,340 B2* | 5/2017 | Kapur | ............... | G06F 3/017 |
| 10,755,487 B1* | 8/2020 | Snibbe | ............... | G06T 19/006 |
| 2013/0113829 A1* | 5/2013 | Suzuki | ............... | G06T 13/40 |
| | | | | 345/633 |

(Continued)

OTHER PUBLICATIONS https://www.retaildive.com/ex/mobilecommercedaily/rimmel-unveils-augmented-reality-mirror-virtual-try-on-options-for-cosmetics (Year: 2017).*

*Primary Examiner* — Matthew E Zimmerman

(57) ABSTRACT

A method includes obtaining, from a first computing device, a request to establish a communications session between the first computing device and a second computing device to initiate a virtual try-on session for a first user of the first computing device. The method proceeds with establishing the communications session between these computing devices, where the communications session is configured to enable the virtual try-on session to be simultaneously viewed on user interfaces of both devices. Further, the method includes receiving, from the first computing device, a selection of items for presentation on a first user graphical representation. In response to this selection, the user interfaces are simultaneously updated to present these items on the first user graphical representation. The method further includes obtaining, from the second computing device, feedback on these items from a second user and updating both user interfaces in accordance with this feedback.

20 Claims, 16 Drawing Sheets

(56) References Cited

U.S. PATENT DOCUMENTS

| | | | |
|---|---|---|---|
| 2014/0035913 A1* | 2/2014 | Higgins | G06Q 30/00 345/420 |
| 2014/0149264 A1* | 5/2014 | Satyanarayana | G06Q 30/06 705/27.2 |
| 2017/0270581 A1* | 9/2017 | Tang | G06Q 30/0643 |

* cited by examiner

METHOD, MEDIUM, AND SYSTEM FOR VIRTUAL TRY-ON COORDINATION VIA COMMUNICATIONS SESSIONS

CROSS-REFERENCE TO RELATED APPLICATIONS

This application claims the benefit of, and priority to, U.S. Provisional Patent Application No. 62/786,728, filed Dec. 31, 2018, entitled "CO-SHOP WITH VIRTUAL TRY-ON," the contents of which are incorporated herein by reference in their entirety.

FIELD OF THE INVENTION

The present disclosure relates to a virtual try-on environment that allows for coordination among various users in real-time.

BACKGROUND

With the advent of augmented reality (AR) technologies, a user can superimpose computer-generated images of various items on to a graphical representation of the user's real-world environment. For instance, retailers often use AR technologies, implemented on an application and/or website, to create a realistic try-on experience for their customers. A customer, accessing the application and/or website, may superimpose a computer-generated image of an item of apparel over a real-world image of the customer to allow the customer to determine how the item of apparel would look on the customer without having to physically don the item in a physical store.

However, when customers shop for these items, either in a physical store or online, these customers often seek feedback from friends and/or family prior to purchasing any of these items. While a customer can send digital images of the customer trying on an item of apparel, the customer may have to wait a significant period of time to obtain feedback from others. Further, sharing images of a customer taken during a virtual try-on experience can be difficult and lack sufficient fidelity to allow others to provide valuable feedback to the customer. Existing AR technologies and social media (e.g., texting, video conferencing, etc.) technologies do not provide a co-operative AR experience through which multiple users can engage in a virtual try-on session.

SUMMARY

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed concepts present a novel approach to establishing a simultaneous try-on session between two users. A first user desires to "try on" virtual items such as jewelry or cloths. The first person wants the opinion of one or more friends before making a purchase. The concepts disclosed herein enable the first user to share their try-on session with another user or more than one addition user who can view a specifically configured interface which can enable them to approve or comment on the look or can make their own suggestions and manipulate the image themselves. Both users can view at least a part of a common interface. Multiple other users could also simultaneously view the try-on session and provide input or suggestions as well. A consensus could be obtained from the friends on what item the first user should purchase. In other words, multiple users could have an interface like is described herein and which they can use to interact with an image to comment on items or make suggestions.

A method can include one or more of the following steps in any order. The steps can include obtaining, from a first computing device, a request to establish a communications session between the first computing device and a second computing device to initiate a virtual try-on session for a first user of the first computing device. The method proceeds with establishing the communications session between these computing devices, where the communications session is configured to enable the virtual try-on session to be simultaneously viewed on user interfaces of both devices. Further, the method includes receiving, from the first computing device, a selection of items to be presented on a graphical representation of the first user. In response to this selection of items, the user interfaces are simultaneously updated to present these items on the graphical representation of the user. The method further includes obtaining, from the second computing device, feedback on these items from a second user and updating both user interfaces in accordance with this feedback. The term "simultaneous" can mean in real-time or close to real-time given network latencies or other issues that might cause a delay in communications while the two individuals are viewing the virtual try-on session.

A system can include one or more processors and memory that includes instructions that, as a result of being executed by the one or more processors, cause the system to obtain, from a first computing device, a request to initiate a communications session between the first computing device and a second computing device to initiate a virtual try-on session for a first user of the first computing device. The system further establishes the communications session, which is configured to enable the virtual try-on session to be simultaneously viewed on user interfaces of the computing devices. In response to receiving, from the first computing device, a selection of items to be presented on a graphical representation of the first user, the system updates the user interfaces to both simultaneously present these items on the graphical representation of the user. Further, in response to obtaining, from the second computing device, feedback associated with these items from a second user, the system updates these user interfaces to present the feedback associated with these items.

A non-transitory computer-readable storage medium can include instructions which, as a result of being executed by one or more processors, cause the one or more processors to obtain, from a first computing device, a request to establish a communications session between the first computing device and a second computing device to initiate a virtual try-on session for a first user of the first computing device. In response to the request, the computer system establishes the communications session, which is configured to enable the virtual try-on session to be simultaneously viewed on user interfaces of both computing devices. The computer system further updates, in response to receiving, from the first computing device, a selection of items to be presented on a graphical representation of the first user, the user interfaces of both computing devices to present these items on the graphical representation of the user. The computer system, in response to obtaining feedback corresponding to these items from a second user, updates the user interfaces of both computing devices to present this feedback.

BRIEF DESCRIPTION OF THE FIGURES

In order to describe the manner in which the above-recited and other advantages and features of the disclosure can be obtained, a more particular description of the principles briefly described above will be rendered by reference to specific embodiments thereof which are illustrated in the appended drawings. Understanding that these figures depict only exemplary embodiments of the disclosure and are not therefore to be considered to be limiting of its scope, the principles herein are described and explained with additional specificity and detail through the use of the accompanying drawings in which.

DETAILED DESCRIPTION

In accordance with some embodiments of the disclosed subject matter, mechanisms (which can include systems, methods, devices, apparatuses, etc.) for executing a co-operative virtual try-on session among different users.

Figure 1:
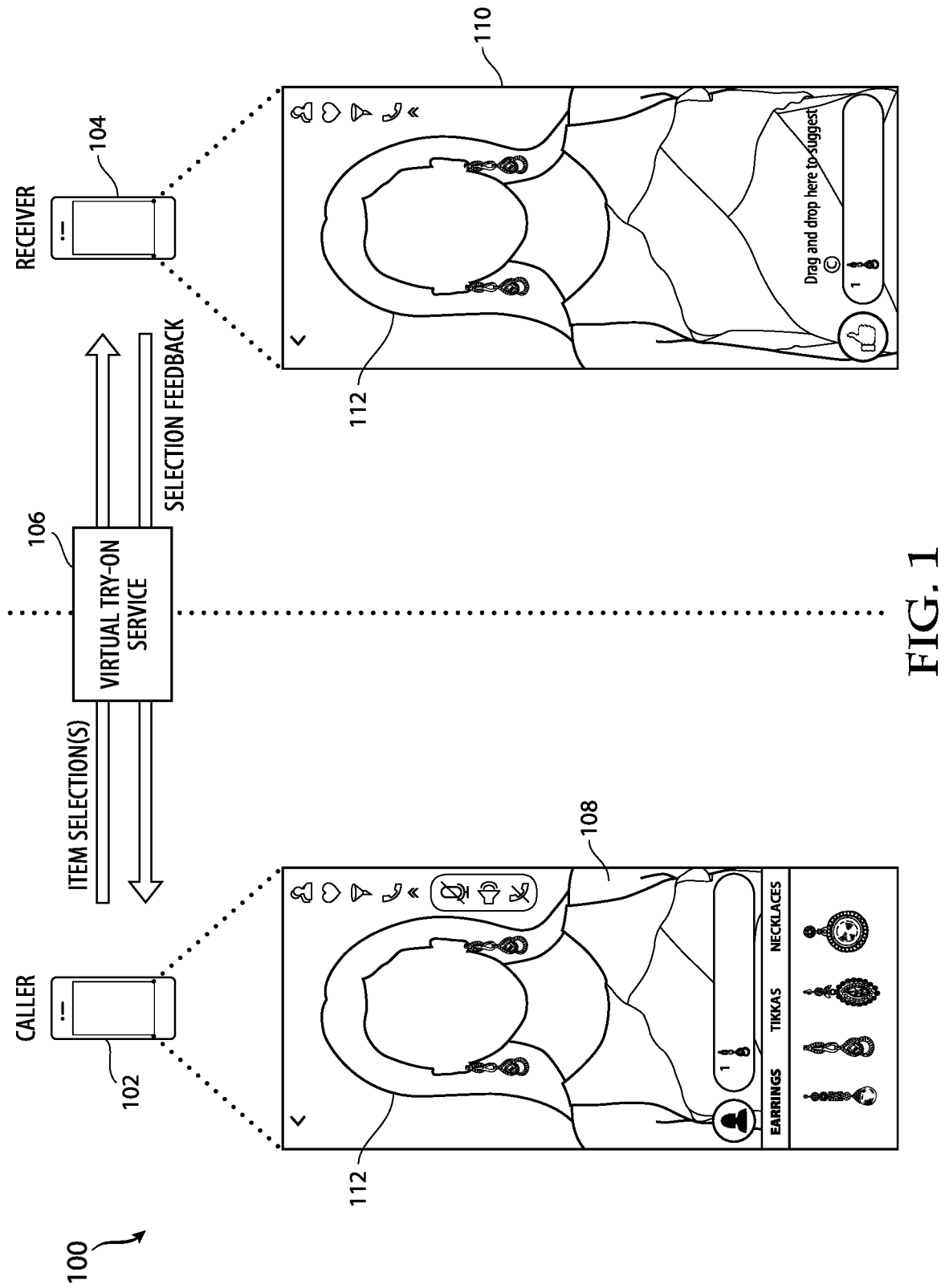
FIG. 1 shows an illustrative example of an environment in which various embodiments can be implemented.

FIG. 1 shows an illustrative example of an environment 100 in which various embodiments can be implemented. In the environment 100, a caller computing device 102, transmits a request to a virtual try-on service 106 to initiate a communications session with a receiver computing device 104 to engage in a co-operative virtual try-on session. The caller computing device 102 may include hardware, firmware, and/or software, and can take any of a variety of form factors. Typical examples of such form factors include laptops, smartphones, small form factor personal computers, personal digital assistants, rackmount devices, and so on. In an embodiment, the caller computing device 102 includes one or more peripheral devices, such as a touchscreen display or other display element (e.g., screen, monitor, etc.), a camera, a lighting element (e.g., flash, light-emitting diode (LED), etc.), and the like. The receiver computing device 104 may include similar, additional, and/or alternative components to those of the caller computing device 102.

In an embodiment, the caller computing device 102 includes a virtual try-on session application that may be used to access the virtual try-on service 106 to submit the request to initiate the communications session with the receiver computing device 104. For instance, through the caller computing device 102, a user may select the virtual try-on session application to cause the caller computing device 102 to execute the application and present, via a display element of the caller computing device 102, a caller user interface 108. The application may cause one or more peripheral devices of the caller computing device 102 to be activated in order to support a virtual try-on session. For instance, the virtual try-on session application may cause the caller computing device 102 to activate a camera and lighting element of the caller computing device 102 to capture live images of the caller for the virtual try-on session.

In an embodiment, upon execution, the virtual try-on session application transmits a request to the virtual try-on service 106 to obtain images and other data corresponding to a set of items that may be used to generate graphical representations of this set of items on the caller computing device 102 for a virtual try-on session. For instance, the virtual try-on session application may obtain, for each available item, an item alpha channel image that may be used to present the item on the caller user interface 108. The virtual try-on session application may further obtain metadata corresponding to this set of items such that a user of the caller computing device 102 may obtain additional information for each item made available by the virtual try-on service 106 (e.g., pricing information, availability information, manufacturer information, etc.). The additional information may further be used to appropriately size the graphical representations of these items on to a caller graphical representation 112 of the entity using the caller computing device 102.

The virtual try-on session application may generate, in response to obtaining the images and other data corresponding to the set of items, a selection pane within the caller user interface 108 to allow the user of the caller computing device 102 to select one or more items to be graphically represented on to the caller graphical representation 112. For instance, if a user of the caller computing device 102 selects an item from the selection pane, the virtual try-on session application may update the caller user interface 108 to present a graphical representation of the item on to the caller graphical representation 112. Additionally, the virtual try-on session application may include, through the caller user interface 108, a review pane through which the user of the caller computing device 102 may identify the selected items presented on the caller graphical representation 112. Through this review pane, a user may identify which items are currently presented via the caller user interface 108. Further, the user may select an item from the review pane for removal of an item graphical representation from the caller user interface 108.

It should be noted that while a virtual try-on session application installed on each of the caller computing device 102 and receiver computing device 104 is described extensively throughout the present disclosure for enabling a virtual try-on session between the caller computing device 102 and the receiver computing device 104, this application may be implemented as a website or otherwise accessed at a location maintained by the virtual try-on service 106. For instance, rather than executing an application installed on the caller computing device 102, a user may access, using the caller computing device 102 and through a browser application, a website maintained by the virtual try-on service 106 to initiate a virtual try-on session with a receiver computing device 104. The virtual try-on service 106, in this example, may transmit executable instructions to the caller computing device 102 to activate one or more peripheral devices of the caller computing device 102 and to transmit data garnered by these one or more peripheral devices to the virtual try-on service 106 for presentation via the website. In one example, a progressive web application can be used as a type of website that can be implemented. It should be noted that the progressive web application and the virtual try-on session application installed on each of the caller computing device 102 and receiver computing device 104 are configured to provide multi-node coordination of electronic communications, display elements, feedback, and other elements of a virtual try-on session in real-time (e.g., simultaneously).

In an embodiment, via the caller user interface 108, the user of the caller computing device 102 can select a receiver with which the user may wish to initiate a virtual try-on session. For instance, via the caller user interface 108, the user of the caller computing device 102 may select a call button. Selection of this call button may cause the virtual try-on session application to access the user's contact list and present this user's contact list via the caller user interface 108. From this contact list, the user may select a contact corresponding to the receiver with which the user may wish to establish the virtual try-on session. This contact may include a telephone number, e-mail address, Internet Protocol (IP) address, user ID specific to the receiver and corresponding to a receiver profile maintained by the virtual try-on service 106, and the like.

In response to a contact selection made by the user of the caller computing device 102, the virtual try-on session application may transmit this contact information to the virtual try-on service 106. The virtual try-on service 106 may include one or more computing devices (e.g., servers, etc.) that may implement virtual try-on sessions among different users over a communications network, such as the Internet. The virtual try-on service 106 may use the provided contact information to establish a communications session between the caller computing device 102 and the receiver computing device 104. For instance, the virtual try-on service 106 may transmit a request to the receiver computing device 104 to initiate a virtual try-on session application installed on the receiver computing device 104. If the receiver computing device 104 has installed the virtual try-on session application, the receiver computing device 104 may prompt a user of the receiver computing device 104 to determine whether to execute this application. If the user of the receiver computing device 104 accepts the request from the virtual try-on service 106 to establish a virtual try-on session with the caller computing device 102, the receiver computing device 104 may execute the virtual try-on application installed on the receiver computing device 104. This virtual try-on application may transmit a response to the virtual try-on service 106, which may provide similar data as that provided to the caller computing device 102. For example, the virtual try-on service 106 may provide images and other data corresponding to a set of items that may be used to generate graphical representations of this set of items on the receiver user interface 110. The receiver user interface 110, during the virtual try-on session, may be similar the caller user interface 108.

Once the communications session has been established between the caller computing device 102 and the receiver computing device 104, the virtual try-on service 106 may present the caller graphical representation 112 and the graphical representations of any selected items on to the receiver user interface 110. Through the communications session, the user of the caller computing device 102 and the user of the receiver computing device 104 may communicate with one another through audiovisual methods. Further, a video feed illustrating a caller graphical representation 112 can be presented, simultaneously, on both the caller user interface 108 and the receiver user interface 110. It should be noted that the term "simultaneously," as used herein, refers to contemporaneous electronic communication of data over a communications session subject to network latency and physical constraints (e.g., distance, speed of light, etc.). Thus, a caller graphical representation 112 captured using a camera of the caller computing device 102 is transmitted, over the communications session, to the receiver computing device 104, which may present this caller graphical representation 112 via the receiver user interface 110. The session may be like a live video conference or a FaceTime communication which is considered generally to be simultaneous but technically includes issues with network latency, etc.

If the user of the caller computing device 102 selects an item to be graphically presented on to the caller graphical representation 112, the virtual try-on session application or website, via the caller computing device 102 or via a network server, may transmit selection information corresponding to this selection to the virtual try-on session application of the receiver computing device 104. In response to obtaining this selection information, the virtual try-on session application of the receiver computing device 104 may update the receiver user interface 110 to present an item graphical representation on to the caller graphical representation 112. Thus, the user of the receiver computing device 104, through the receiver user interface 110, may see the item graphical representation on the live caller graphical representation 112 as captured by the camera of the caller computing device 102.

In an embodiment, the virtual try-on session application, through the receiver user interface 110, presents the user of the receiver computing device 104 with one or more options to provide feedback with regard to the selection of items made by the user of the caller computing device 102. For instance, through the receiver user interface 110, the virtual try-on session application may present the user of the receiver computing device 104 with a menu comprising a set of emojis that may be used to convey the user's feedback. Additionally, or alternatively, the virtual try-on session application may provide the user of the receiver computing device 104 with a selection pane through which the user may select one or more alternative items that may be presented on the caller graphical representation 112. If the user of the receiver computing device 104, through the receiver user interface 110, provides feedback on the one or more items selected by the user of the caller computing device 102, the receiver computing device 104 may transmit, over the communications session, this feedback to the caller computing device 102. The virtual try-on session application of the caller computing device 102 may process the obtained feedback and update the caller user interface 108 to present the feedback provided by the user of the receiver computing device 104.

A separate video conference window could be provided for the users to view each other as well in connection with the virtual try-on session. In another aspect, an audio feed can be provided between the users while the video or graphical image shown in FIG. 1 is provided so that the users can talk about how the items look on the image.

At any time, the user of the caller computing device 102 or the user of the receiver computing device 104 may submit a request to the virtual try-on service 106 to terminate the virtual try-on session and the communications session between the caller computing device 102 and the receiver computing device 104. In response to the request, the virtual try-on service 106 may terminate the communications session between the caller computing device 102 and the receiver computing device 104. Additionally, the virtual try-on service 106 may transmit executable instructions to the virtual try-on session applications of both the caller computing device 102 and the receiver computing device 104. As a result of executing these instructions, the virtual try-on session applications may update each of the caller user interface 108 and the receiver user interface 110 to indicate that the virtual try-on session has been terminated.

Figure 2:
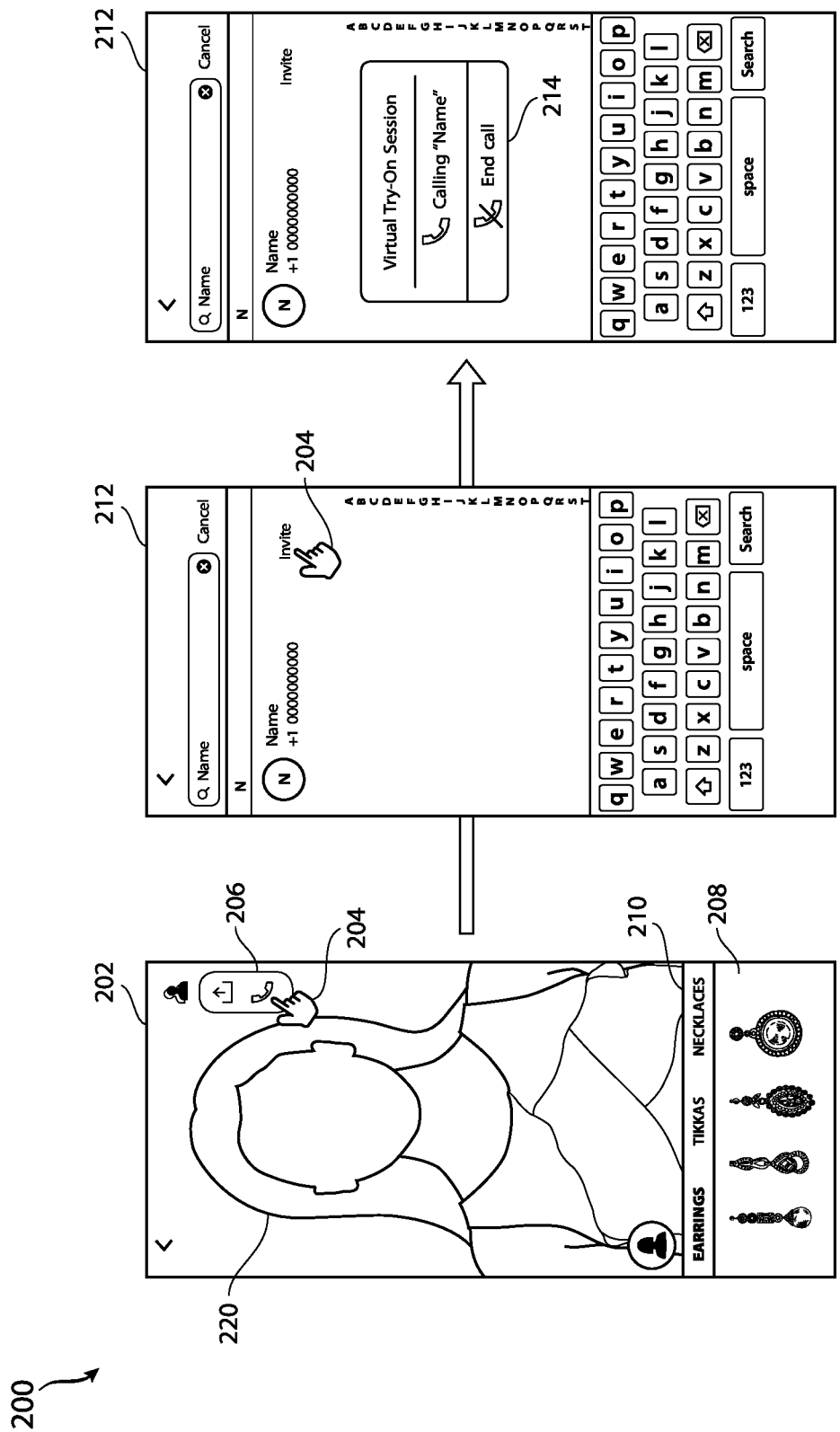
FIG. 2 shows an illustrative example of an environment in which a caller submits a request to initiate a communications session with a receiver to engage in a virtual try-on session in accordance with at least one embodiment.

FIG. 2 shows an illustrative example of an environment 200 in which a caller submits a request to initiate a communications session with a receiver to engage in a virtual try-on session in accordance with at least one embodiment. In the environment 200, a caller, via a caller user interface 202, selects a call button from a communications pane 206 provided by the virtual try-on session application installed on the caller computing device. As illustrated in FIG. 2, the caller user interface 202 provided by the virtual try-on session application may include a set of components. For instance, the caller user interface 202 may include an item selection pane, through which a user (e.g., caller) may select one or more items that are to be graphically represented, via the caller user interface 202, on to a caller graphical representation 220. The caller graphical representation 220 may be generated using one or more peripheral devices of the caller computing device, such as a camera and lighting element. The caller graphical representation 220 may, thus, be a real-time representation of the caller as the caller appears before the camera of the caller computing device or of any other computing device in electrical communication with the caller computing device.

Additionally, the caller user interface 202 may include the aforementioned communications pane 206, which may be used to present the user with a set of options for establishing a virtual try-on session with another user or to provide details of the current virtual try-on session to other users. For instance, through the communications pane 206, the user may share images of the user captured during a virtual try-on session to another user via e-mail, instant messaging, or any other communications methods. The communications pane 206 may also include a call button, which the user may select to request creation of a virtual try-on session with another user (e.g., receiver). Using a cursor 204 or other selection mechanism (e.g., a touching of the call button on the caller user interface 202 if presented on a touchscreen, etc.), the user may select the call button to cause the virtual try-on session application to update the caller computing device to present a contacts user interface 212.

Through the contacts user interface 212, the virtual try-on session application may present the user with a list or other ordering of known contacts that the user may establish a virtual try-on session with. Each contact presented in the contacts user interface 212 may correspond to an entry in a database maintained by the caller computing device and/or the virtual try-on service. For instance, in response to selection of the call button, the virtual try-on session application may transmit a request to the virtual try-on service to obtain contact information for entities associated with a caller profile. Additionally, or alternatively, the virtual try-on session application may retrieve contact information from the caller computing device itself.

Using a cursor 204 or other selection mechanism, the user may select a contact from the contacts user interface 212 to indicate that the user wishes to establish a virtual try-on session with this contact. In response to detecting selection of a particular contact, the virtual try-on session application may obtain the contact information associated with the selected contact and provide this contact information to the virtual try-on service. The virtual try-on service may use the provided contact information to transmit a request to a computing device of the contact to join the virtual try-on session being established by the caller. While awaiting a response from the contact, the virtual try-on session application may present, via the contacts user interface 212, a graphical window 214 indicating that the contact is being reached. The virtual try-on session application may also present, via the graphical window 214, a terminate button that may be used to terminate the request to establish the virtual try-on session with the selected contact.

In an embodiment, rather than transmitting a request to the virtual try-on service to establish the communications session with the selected contact, the virtual try-on session application uses the contact information and the caller computing device to transmit a request to the contact to initiate the virtual try-on session over a communications session. For instance, if the contact information includes a telephone number of the contact, the virtual try-on session application may cause the caller computing device to transmit a request to this telephone number that may cause the computing device of the contact to alert the contact of the request. If the contact accepts the request, a virtual try-on session application installed on the computing device of the contact may obtain data, over the communications session, to present the contact with a video feed of the caller, along with any item selections made by the caller. Alternatively, if the contact information includes an e-mail address or other electronic address (e.g., IP address) of the contact or of the contact computing device, the virtual try-on session application may transmit a request to the contact computing device using this e-mail address or other electronic address.

If the selected contact does not have a virtual try-on session application installed on its computing device, the contact may be prompted, via its computing device, to download or otherwise obtain the application and install the application on its computing device. Alternatively, the contact may be presented, via its computing device, with an electronic address of the virtual try-on service, which the contact may access to partake in the virtual try-on session with the caller. The virtual try-on service may interact with the virtual try-on session application of the caller computing device to provide the live video feed of the caller and any graphical representations of items presented on a graphical representation of the caller presented over the live video feed to the contact. The contact may also be provided with a URL of a website (or progressive web application) which is configured to establish the session.

Figure 3:
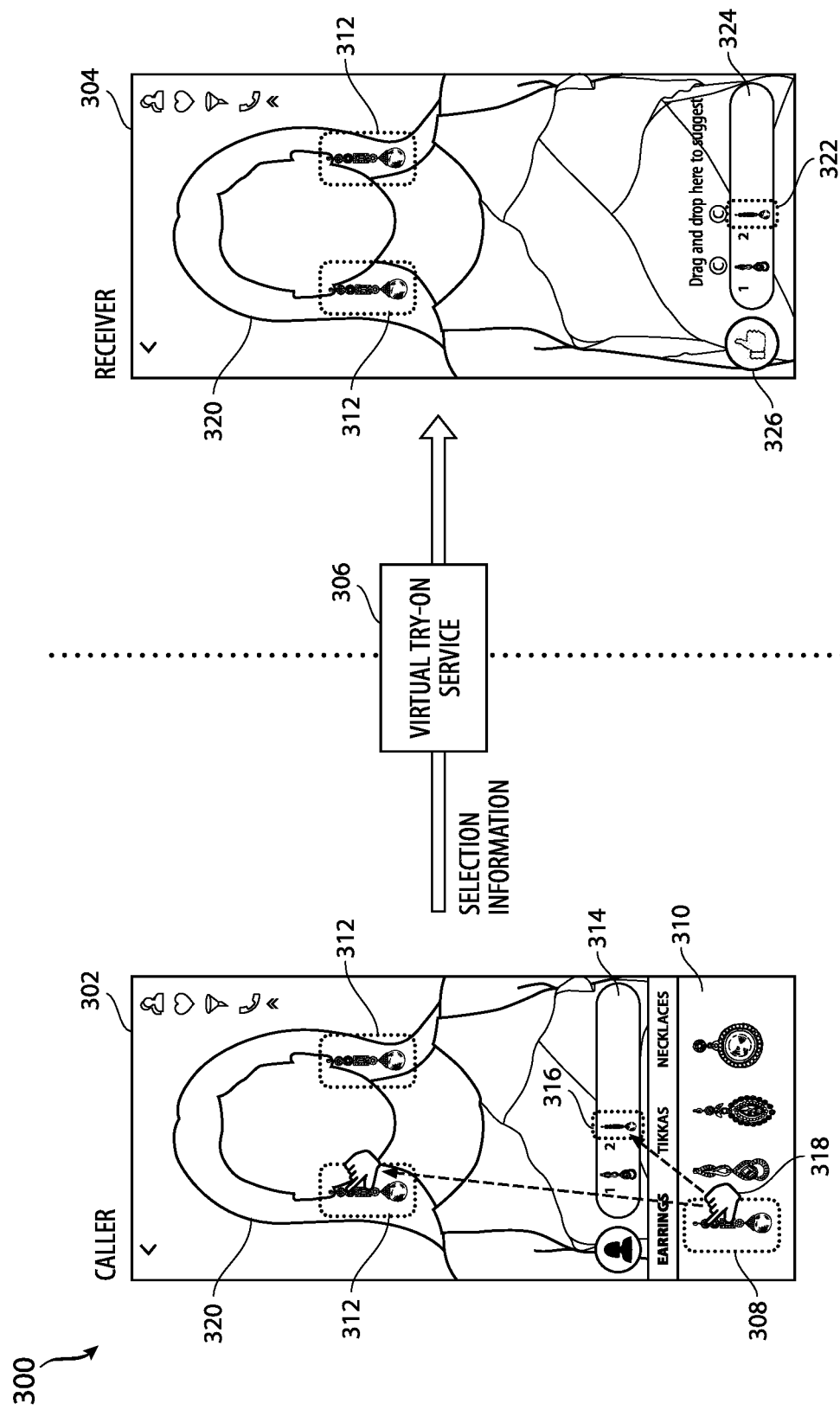
FIG. 3 shows an illustrative example of an environment in which placement of a virtual try-on item onto a graphical representation of the caller is simultaneously presented on a caller user interface and receiver user interface in accordance with at least one embodiment.

FIG. 3 shows an illustrative example of an environment 300 in which placement of a virtual try-on item 312 onto a caller graphical representation 320 is simultaneously presented on a caller user interface 302 and receiver user interface 304 in accordance with at least one embodiment. In the environment 300, a live video feed of a caller may be represented simultaneously via a caller user interface 302 of a caller computing device and a receiver user interface 304 of a receiver computing device. This live video feed may result in the creation of a caller graphical representation 320 that may continuously change based on the motion and other actions of the caller over the live video feed. In an embodiment, through the caller user interface 302, a caller can select an item to be graphically represented on to the caller graphical representation 320. For instance, the caller user interface 302 may include a selection pane 310, through which a selection of items that may be graphically represented on to the caller graphical representation 320 may be presented. Using a cursor 318 or other selection mechanism, the caller may select, from the selection pane 310, an item, resulting in a selection 308. Using the cursor 318 or other selection mechanism, the caller may drag the selection 308 on to an element of the caller graphical representation 320 to create an item graphical representation 312 on the element. For example, as illustrated in FIG. 3, dragging the selection 308 to an ear of the caller in the caller user interface 302 may cause an item graphical representation 312 to appear at the ears of the caller.

In an embodiment, each item represented in the selection pane 310 is associated with item metadata that is used to determine an appropriate placement of a graphical representation of the item onto the caller graphical representation 320. For instance, if the item is identified, in the metadata, as being an earring, the virtual try-on session application may determine that the item may be placed on nodes of the caller graphical representation 320 corresponding to the ears of the caller. Thus, the item graphical representation 312 of the earrings may be placed on to the caller graphical representation 320 on nodes corresponding to the ears of the caller. Further, since earrings may be classified, in the metadata, as being applicable to both ears of the caller, the virtual try-on session application may duplicate the item graphical representation 312 such that it appears on nodes corresponding to the ears of the caller. To identify these nodes, the virtual try-on session application may evaluate the caller graphical representation 320 to identify key body features (e.g., eyes, nose, ears, mouth, neck, arms, hair, etc.) to which items may be affixed.

In an embodiment, if the caller adds an item graphical representation 312 to the caller graphical representation 320, the virtual try-on session application may transmit selection information to the virtual try-on service 306 to cause this item graphical representation 312 to be presented simultaneously on to the caller graphical representation 320 presented on the receiver user interface 304. The selection information may include an identifier of the selected item, as well as position information that may be used to reproduce the item graphical representation 312 on the receiver user interface 304. In an alternative example, the virtual try-on session application may transmit the selection information directly to the receiver computing device over the communications session to cause the receiver computing device, through its virtual try-on session application, to simultaneously reproduce the item graphical representation 312 on to the caller graphical representation 320.

In an embodiment, a second item graphical representation 316 is presented on an item ordering pane 314 presented via the caller user interface 302. The item ordering pane 314 may be used to present an ordering of items previous selected by the caller and/or by the receiver during the virtual try-on session. For instance, when the caller drags the selection 308 on to an element of the caller graphical representation 320 to create an item graphical representation 312 on the element, the virtual try-on session application may generate the second item graphical representation 316 and add this second item graphical representation 316 to the item ordering pane 314.

When the item graphical representation 312 is reproduced on the receiver user interface 304, the virtual try-on session application of the receiver computing device may add a second item graphical representation 322 to an item ordering pane 324 presented on the receiver user interface 304. The second item graphical representation 322 presented within the item ordering pane 324 may include additional and/or alternative elements compared to the second item graphical representation 316 presented through the caller user interface 302. For instance, the second item graphical representation 322 may include an icon or other indicator that the selection of this item was made by the caller. As illustrated in FIG. 3, the second item graphical representation 322 may include, above the image of the item, a "C" to denote that the item was selected by the caller. This enables the receiver to readily identify which entity made the corresponding selection for presentation on the caller graphical representation 320.

The receiver user interface 304 may further include a feedback button 326, which may be used to generate feedback on one or more item selections presented via the receiver user interface 304. The generation and propagation of feedback is described in greater detail below with regard to FIG. 4.

Figure 4:
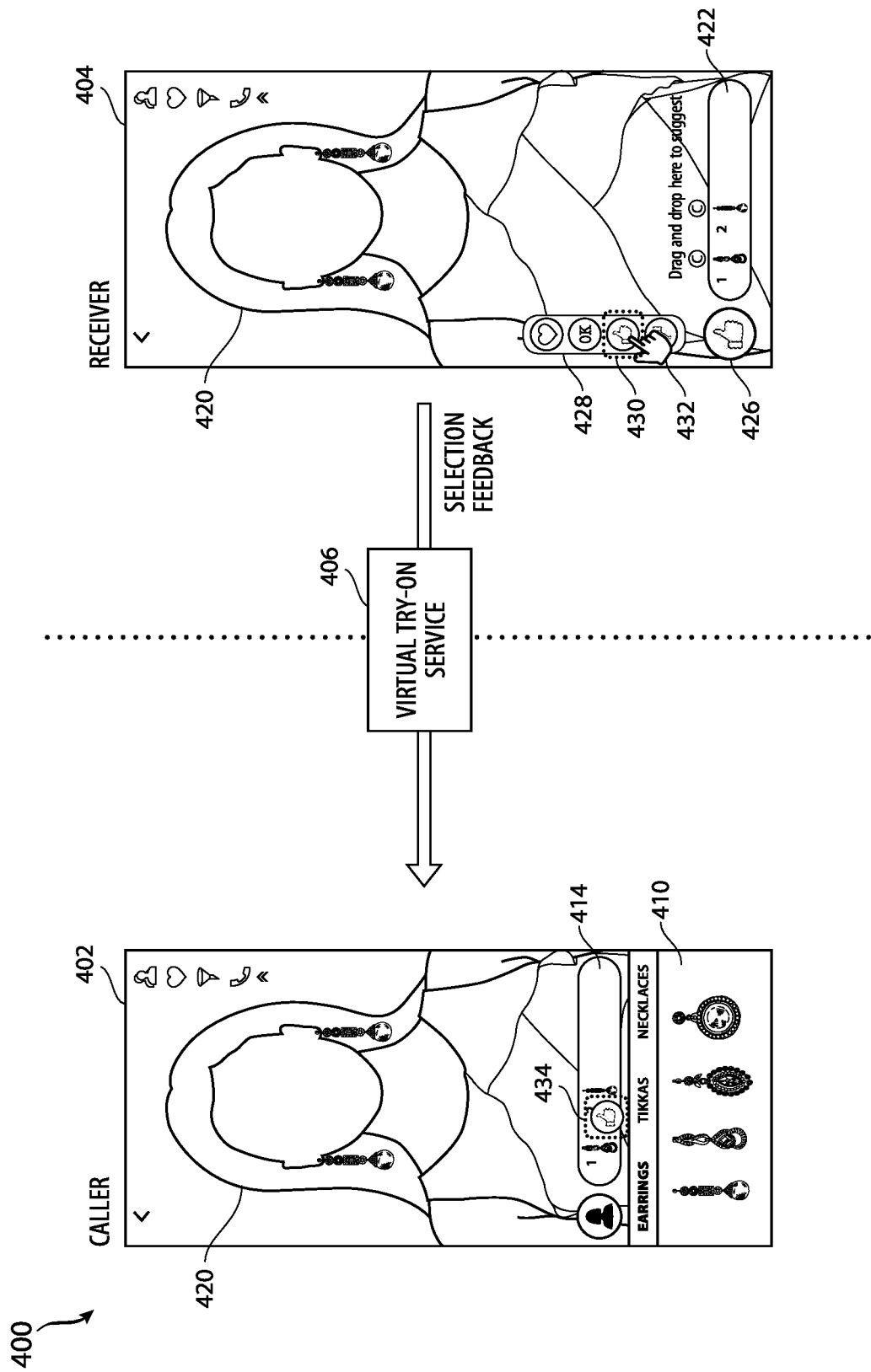
FIG. 4 shows an illustrative example of an environment in which feedback provided by a receiver to the caller through a receiver user interface is presented simultaneously on a caller user interface and receiver user interface in accordance with at least one embodiment.

FIG. 4 shows an illustrative example of an environment 400 in which feedback provided by a receiver to the caller through a receiver user interface 404 is presented simultaneously on a caller user interface 402 and receiver user interface 404 in accordance with at least one embodiment. In the environment 400, a receiver, via the receiver user interface 404, may select a feedback button 426 to provide feedback to the caller with regard to a caller selection of a particular item graphically represented on a caller graphical representation 420 within the receiver user interface 404 and caller user interface 402. For instance, using a cursor 432 or other selection mechanism such as a gesture, voice, movement of the device, and so forth, the receiver may select the feedback button 426 to cause the virtual try-on session application to present, via the receiver user interface 404, a feedback selection pane 428.

In an embodiment, the feedback selection pane 428 includes one or more emojis 430 that may serve as an indication of the receiver's opinion with regard to the item selected by the caller and graphically represented simultaneous on the caller user interface 402 and receiver user interface 404. It should be noted that while emojis are used throughout the present disclosure for the purpose of illustration, other feedback options may be presented via the feedback selection pane 428. For instance, in addition to the emojis 430 or as an alternative to these emojis 430, the virtual try-on session application may present the receiver, via the receiver user interface 404, with an input field through which the receiver may provide one or more statements as feedback to the caller selection of the one or more items. Audio, video, or other feedback can be provided as well from the user. For example, the user can select prerecorded audio or could record an audio snippet which is communicated to the caller.

If the receiver selects an emoji 430 or other form of feedback from the feedback selection pane 428, the virtual try-on session application operating on the receiver computing device may transmit information corresponding to the selected emoji 430 or other form of feedback (e.g., selection feedback) to the caller computing device over the communications session. Alternatively, the virtual try-on session application may transmit this selection feedback to the virtual try-on service 406, which may provide information corresponding to this selection feedback to the caller computing device.

In response to obtaining the information corresponding to the selection feedback from the receiver computing device, the virtual try-on session application of the caller computing device may use the information to present a second emoji 434 within the item ordering pane 414 of the caller user interface 402. The second emoji 434 may be identical to the emoji 430 selected by the receiver via the feedback selection pane 428. The virtual try-on session application of the caller computing device may position the second emoji 434 next to or in the area of a graphical representation of the item presented within the item ordering pane 414. This allows the caller to readily identify the feedback for its selection of the item, as represented on the caller graphical representation 420. It should be noted that the caller user interface 402 and receiver user interface 404 may be similar to the caller user interface 302 and receiver user interface 304, respectively, described above in connection with FIG. 3. For instance, in addition to the item ordering pane 414, the caller user interface 402 may also include the selection pane 410, which allows the caller to select items to be graphically represented on the caller graphical representation 420. Additionally, the receiver user interface 404 may also include an ordering pane 422, which may be used by the receiver to determine the ordering in which item graphical representations were added to the caller graphical representation 420 during the virtual try-on session.

Figure 5:
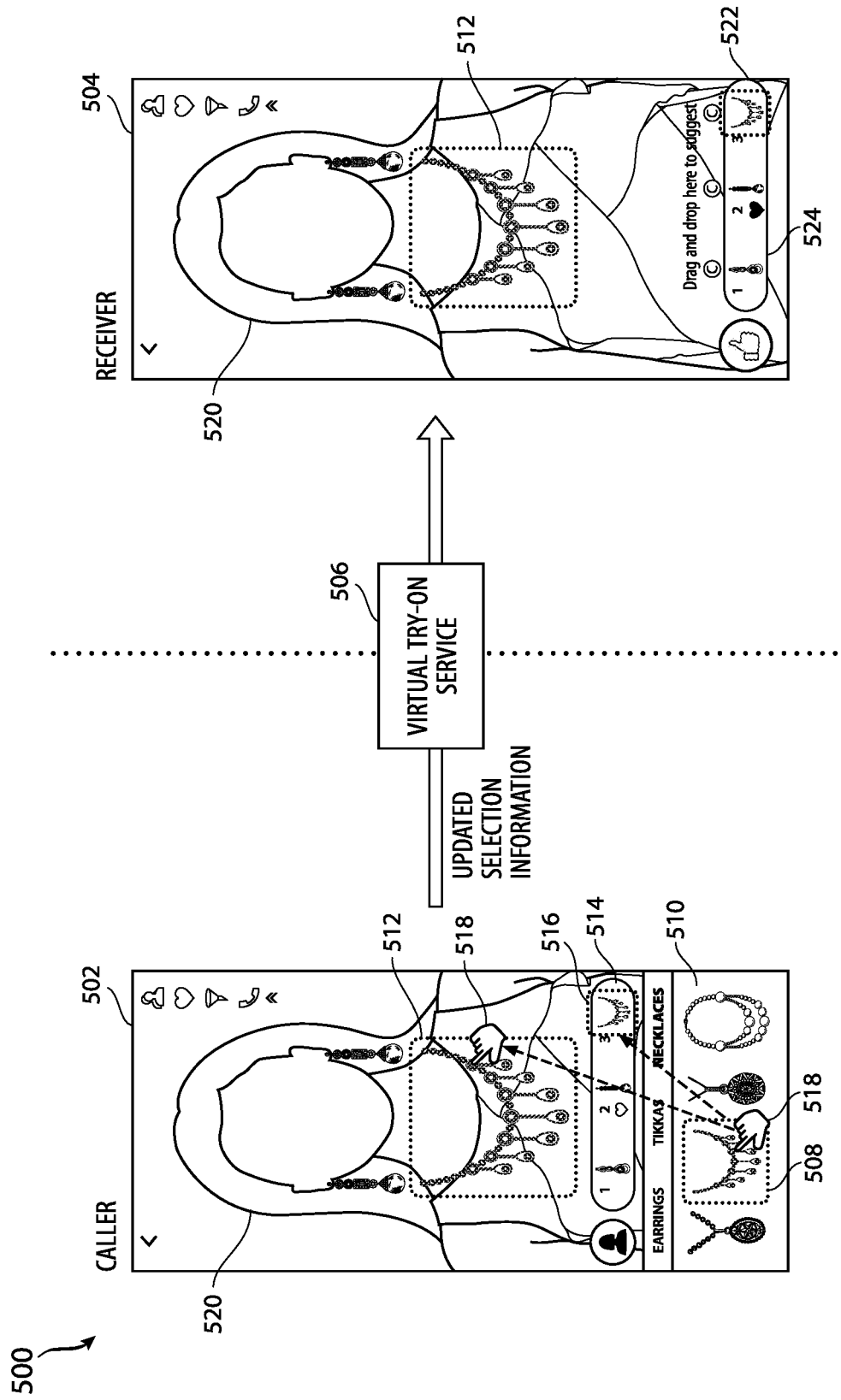
FIG. 5 shows an illustrative example of an environment in which placement of a new virtual try-on item onto a graphical representation of the caller is presented simultaneously on a caller user interface and receiver user interface in accordance with at least one embodiment.

FIG. 5 shows an illustrative example of an environment 500 in which placement of a new virtual try-on item onto a caller graphical representation 520 is presented simultaneously on a caller user interface 502 and receiver user interface 504 in accordance with at least one embodiment. In the environment 500, a caller may utilize a cursor 518 or other selection mechanism to select, from the selection pane 510 of the caller user interface 502, a graphical representation 508 of a new virtual try-on item. Using the cursor 518 or other selection mechanism, the caller may drag the graphical representation 508 on to a particular location on the caller graphical representation 520. For example, as illustrated in FIG. 5, the caller may use the cursor 518 to drag and drop a graphical representation 508 of a new try-on item on to the neck of the caller graphical representation 520. In response to this action, the virtual try-on session application of the caller computing device may generate a scaled graphical representation 512 of the new try-on item on the caller graphical representation 520. In an embodiment, to place the scaled graphical representation 512 of the new try-on item on the caller graphical representation 520, the virtual try-on session application may identify one or more nodes corresponding to the caller graphical representation 520 that may be used to position and size the scaled graphical representation 512 of the new try-on item.

In addition to generating a scaled graphical representation 512 of the new try-on item on the caller graphical representation 520, the virtual try-on session application may add an item graphical representation 516 to an item ordering pane 514 to denote the ordering in which the various items represented on the caller graphical representation were selected. This allows the caller to determine the ordering in which the graphically represented items were placed on the caller graphical representation 520 during the virtual try-on session with the receiver.

In an embodiment, the virtual try-on session application of the caller computing device transmits updated selection information corresponding to caller selection of the new try-on item to the virtual try-on service 506. The virtual try-on service 506 may provide this updated selection information to the virtual try-on session application of the receiver computing device to cause this virtual try-on session application to simultaneously update the receiver user interface to integrate selection of the new try-on item on to the caller graphical representation 520 presented via the receiver user interface 504. The virtual try-on session application of the receiver computing device may update the receiver user interface 504 to present the scaled graphical representation 512 of the new try-on item on the caller graphical representation 520. Further, the virtual try-on session application of the receiver computing device may update the item ordering pane 524 presented on the receiver user interface 504 to add another item graphical representation 522. Thus, the receiver may use the item ordering pane 524 to identify the ordering of items presented on the caller graphical representation 520 via the receiver user interface 504.

In an embodiment, each virtual try-on item that may be graphically represented on a caller graphical representation 520 is classified based on the possible placement locations for the virtual try-on item. For example, an earring may be classified as being placeable on the ears of the caller graphical representation 520, a necklace may be classified as being placeable on the neck of the caller graphical representation 520, and the like. If the caller selects a virtual try-on item, from the selection pane 510, that has the same classification as another virtual try-on item graphically represented on the caller graphical representation 520, the virtual try-on session application may replace the graphical representation of this other virtual try-on item with a new graphical representation of the newly selected virtual try-on item. The replacement of the graphical representation of this other virtual try-on item with the new graphical representation of the newly selected virtual try-on item may be performed simultaneously on the caller user interface 502 and the receiver user interface 504.

Further, while the graphical representation of this other virtual try-on item may be removed from the caller graphical representation 520, another graphical representation of this other virtual try-on item may be maintained within both the item ordering pane 514 of the caller user interface 502 and the item ordering pane 524 of the receiver user interface 504 to preserve the ordering in which virtual try-on items were introduced on to the caller graphical representation 520 over the duration of the virtual try-on session. In an embodiment, the caller and/or receiver may select, from their respective item ordering panes 514, 524, the other graphical representation of this other virtual try-on item to cause this other virtual try-on item to be graphically represented on to the caller graphical representation 520 simultaneously on the caller user interface 502 and receiver user interface 504.

Figure 6:
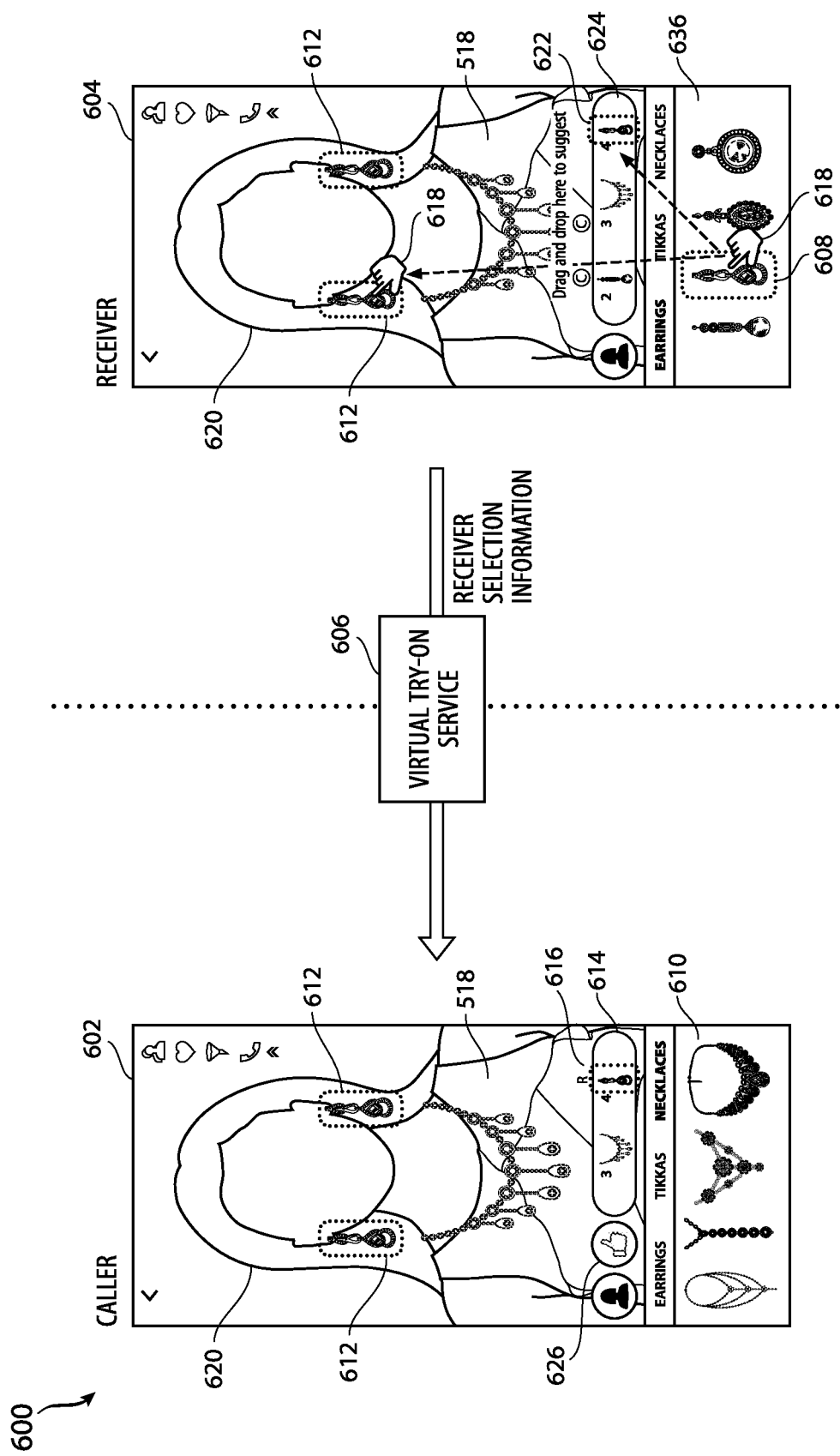
FIG. 6 shows an illustrative example of an environment in which placement of an alternative virtual try-on item by a receiver through a receiver user interface is presented simultaneously on a caller user interface and the receiver user interface in accordance with at least one embodiment.

FIG. 6 shows an illustrative example of an environment 600 in which placement of an alternative virtual try-on item by a receiver through a receiver user interface 604 is presented simultaneously on a caller user interface 602 and the receiver user interface 604 in accordance with at least one embodiment. In the environment 600, the receiver, via a receiver user interface 604, may select an alternative try-on item to be graphically represented on a caller graphical representation 620. For instance, through the receiver user interface 604, the receiver may select an option to cause the virtual try-on session application to update the receiver user interface 604 and present a selection pane 636. The selection pane 636 may include graphical representations of various try-on items that are available for display on the caller graphical representation 620. This selection of try-on items presented via the selection pane 636 may be similar to the selection of try-on items presented to the caller via the selection pane 610 of the caller user interface 602.

The receiver, using a cursor 618 or other selection mechanism, may select a graphical representation 608 of an alternative try-on item for presentation on the caller graphical representation 620. Similar to the process described above in connection with FIGS. 3 and 5, the receiver may drag the graphical representation 608 of the alternative try-on item to a particular location on the caller graphical representation 620 to indicate where the graphical representation 612 of the alternative try-on item is to be presented on the caller graphical representation 620. Alternatively, if the receiver selects the graphical representation 608 of the alternative try-on item from the selection pane 636, the virtual try-on session application may identify, based on a classification of the item (e.g., earrings, tikkas, necklaces, etc.), the location on the caller graphical representation 620 where the graphical representation 612 of the virtual try-on item is to be presented.

In an embodiment, selection of an alternative try-on item from the selection pane 636 causes the virtual try-on session application to add a graphical representation 622 of the alternative try-on item to the item ordering pane 624 presented on the receiver user interface 604. As noted above, the item ordering pane 624 may be used to denote an ordering in which virtual try-on items were graphically represented on to the caller graphical representation 620 during the virtual try-on session. Further, if the caller graphical representation 620 includes an existing graphical representation of an item of the same classification as the virtual try-on item selected by the receiver via the selection pane 636, the virtual try-on session application may replace the existing graphical representation of the item with the graphical representation 612 of the alternative try-on item selected by the receiver.

Upon selection of the alternative try-on item from the selection pane 636 and placement of the graphical representation 612 of the alternative try-on item on to the caller graphical representation 620, the virtual try-on session application may transmit information corresponding to the receiver's selection and placement of the alternative try-on item to the virtual try-on service 606, which may provide this information to the virtual try-on session application of the caller computing device. In response to obtaining this information, the virtual try-on session application of the caller computing device may simultaneously update the caller user interface 602 to present the graphical representation 612 of the alternative try-on item on the caller graphical representation 620 at the location indicated by the receiver or otherwise corresponding to the alternative try-on item based on the classification of the alternative try-on item. Additionally, the virtual try-on session application of the caller computing device may update the item ordering pane 614 to add another graphical representation 616 of the alternative try-on item. This other graphical representation 616 may be presented within the item ordering pane 614 based on the ordering in which the virtual try-on items were graphically represented on the caller graphical representation 620. Further this other graphical representation 616 may include an indication (e.g., "R", as illustrated in FIG. 6) that the selection of the alternative try-on item was made by the receiver. Thus, the caller, through the item ordering pane 614, may identify the source of the selection.

It should be noted that the receiver can provide selection feedback to the caller using additional and/or alternative methods during the virtual try-on session. For example, in an embodiment, rather than using the cursor 618 to drag the graphical representation 608 of the alternative try-on item from the selection pane 636 to the caller graphical representation 620, the receiver may drag the graphical representation 608 of the alternative try-on item on to the item ordering pane 624 to suggest, to the caller, that the caller should consider this alternative try-on item. Further, in response to the receiver adding the graphical representation 608 of the alternative try-on item on to the item ordering pane 624, the virtual try-on session application may add a graphical representation 622 of the alternative try-on item to the item ordering pane 624 presented on the receiver user interface 604. In some instances, the virtual try-on session application may transmit this selection information to the virtual try-on service 606, which may transmit the selection information to the virtual try-on session application of the caller to cause the graphical representation 612 of the alternative try-on item to be presented simultaneously on both the caller user interface 602 and receiver user interface 604. Further, the virtual try-on session application of the caller may update the item ordering pane 614 to present a graphical representation 616 of the alternative try-on item. During the virtual try-on session, the receiver may further provide audial feedback. For instance, the receiver computing device may transmit, over the communications session, audial communications generated by the receiver to the caller computing device. These audial communications may include the receiver's feedback with regard to the caller's selection of a particular item.

Figure 7:
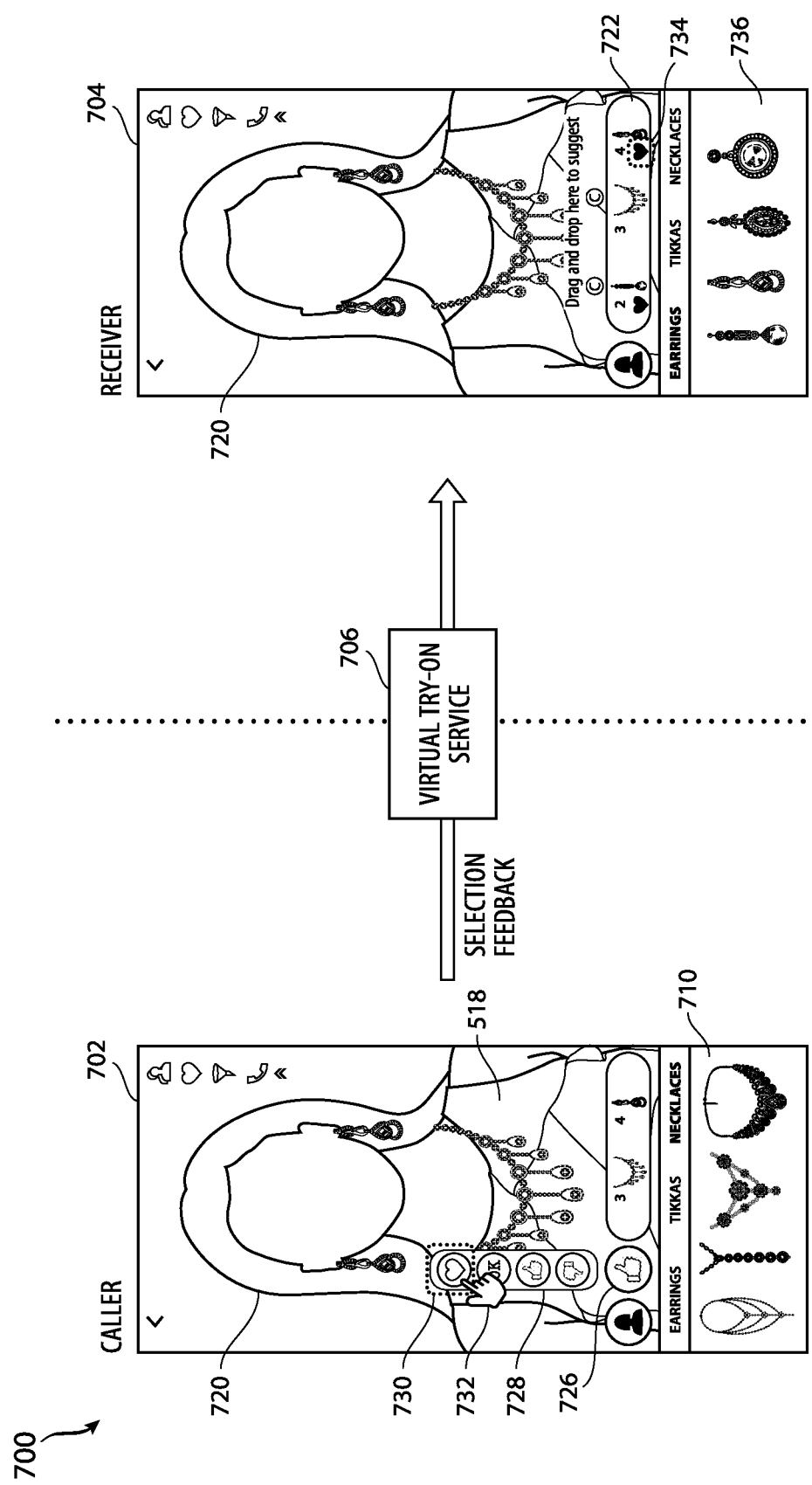
FIG. 7 shows an illustrative example of an environment in which feedback provided by a caller to the receiver through a caller user interface is presented simultaneously on the caller user interface and a receiver user interface in accordance with at least one embodiment.

FIG. 7 shows an illustrative example of an environment 700 in which feedback provided by a caller to the receiver through a caller user interface 702 is presented simultaneously on the caller user interface 702 and a receiver user interface 704 in accordance with at least one embodiment. The caller user interface 702 may include similar elements to that of the caller user interface 602 described above in connection with FIG. 6. For instance, the caller user interface 702 may include a caller graphical representation 720 and an item selection pane 710. Further, the receiver user interface 704 may include similar elements to that of the receiver user interface 604 described above in connection with FIG. 6. For instance, the receiver user interface 704 may include the caller graphical representation 720, the item ordering pane 722, and the item selection pane 736.

In an embodiment, in response to the receiver selecting an alternative try-on item to be graphically represented on the caller graphical representation 720 on the caller user interface 702 and receiver user interface 704, the virtual try-on session application of the caller computing device presents, via the caller user interface 702, a feedback button 726. The caller, via the caller user interface 702, may select the feedback button 726 to provide feedback to the receiver with regard to a receiver selection of the alternative try-on item graphically represented on a caller graphical representation 720 within the receiver user interface 704 and caller user interface 702. For instance, using a cursor 732 or other selection mechanism, the caller may select the feedback button 726 to cause the virtual try-on session application to present, via the caller user interface 703, a feedback selection pane 728.

Similar to the feedback selection pane 428 described above in connection with FIG. 4, the feedback selection pane 728 includes one or more emojis 730 that may serve as an indication of the caller's opinion with regard to the alternative try-on item selected by the receiver and graphically represented simultaneously on the caller user interface 702 and receiver user interface 704. If the caller selects an emoji 730 or other form of feedback from the feedback selection pane 728, the virtual try-on session application operating on the caller computing device may transmit information corresponding to the selected emoji 730 or other form of feedback (e.g., selection feedback) to the receiver computing device over the communications session. Alternatively, the virtual try-on session application may transmit this selection feedback to the virtual try-on service 706, which may provide information corresponding to this selection feedback to the receiver computing device.

In response to obtaining the information corresponding to the selection feedback from the caller computing device, the virtual try-on session application of the receiver computing device may use the information to present a second emoji 734 within the item ordering pane 722 of the receiver user interface 704. The second emoji 734 may be identical to the emoji 730 selected by the caller via the feedback selection pane 728. The virtual try-on session application of the receiver computing device may position the second emoji 734 next to or in the area of a graphical representation of the alternative try-on item presented within the item ordering pane 722. This allows the receiver to readily identify the feedback for its selection of the alternative try-on item, as represented on the caller graphical representation 720. Additional or alternative methods for providing selection feedback may be used, such as those described above in connection with FIG. 6.

Figure 8:
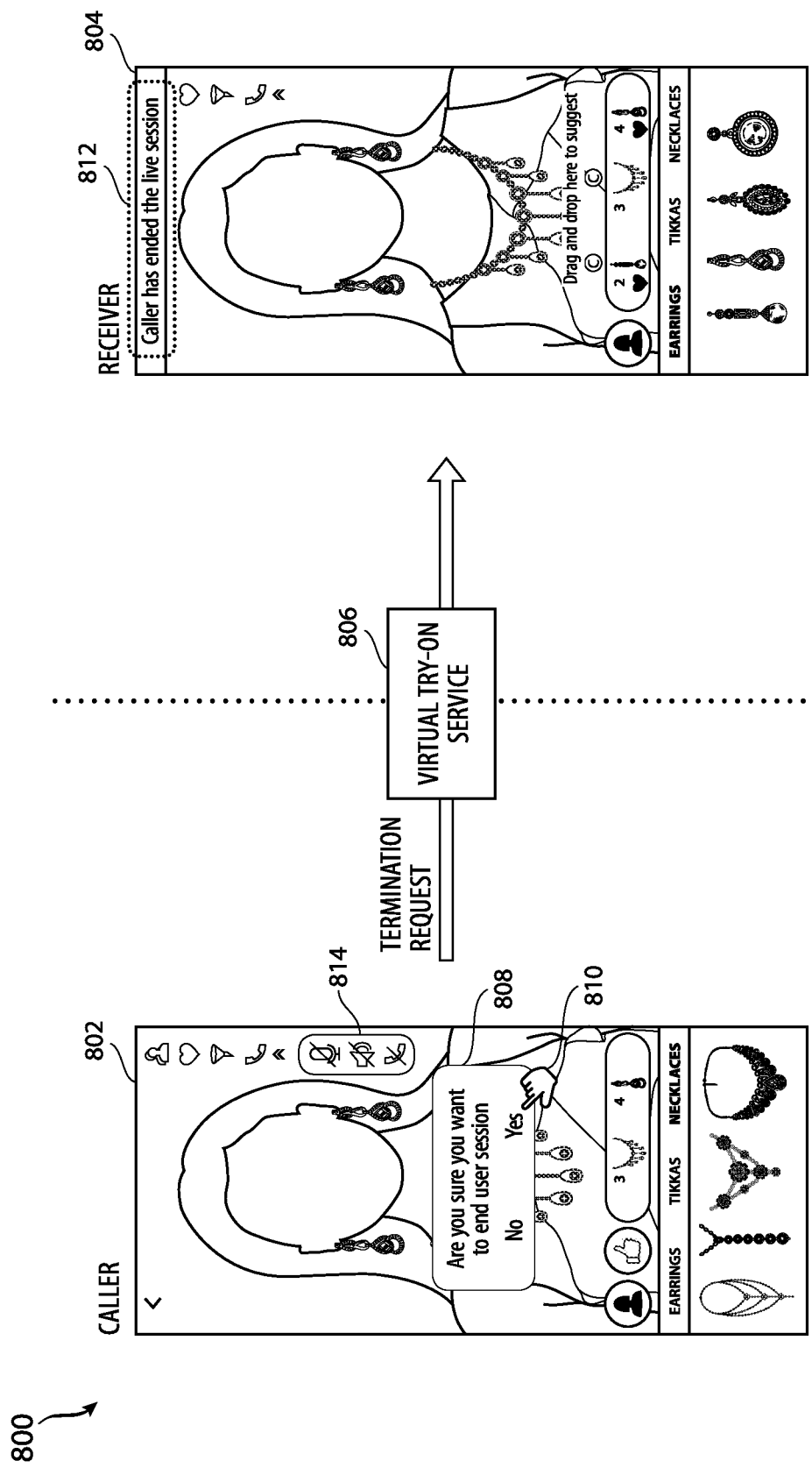
FIG. 8 shows an illustrative example of an environment in which a virtual try-on session between a caller and a receiver is terminated in response to a request from the caller in accordance with at least one embodiment.

FIG. 8 shows an illustrative example of an environment 800 in which a virtual try-on session between a caller and a receiver is terminated in response to a request from the caller in accordance with at least one embodiment. In the environment 800, a caller selects, using a cursor 810 or other selection mechanism and from a session control pane 814 presented via the caller user interface 802, an option to terminate the virtual try-on session between the caller and the receiver. In response to the caller selecting this option from the session control pane 814, the virtual try-on session application may update the caller user interface 802 to present the caller with a dialog box 808 comprising options to terminate the virtual try-on session (e.g., "Yes," as represented within the dialog box 808) and to continue the virtual try-on session (e.g., "No," as represented within the dialog box 808). Using the cursor 810 or other selection mechanism, the caller may confirm that the virtual try-on session is to be terminated or indicate that the virtual try-on session is to continue.

If the caller, via the dialog box 808, confirms that the virtual try-on session is to be terminated, the virtual try-on session application of the caller computing device may transmit a request to the virtual try-on service 806 to terminate the communications session between the caller computing device and the receiver calling device. In response to the request, the virtual try-on service 806 may terminate the communications session and transmit a notification to each of the caller computing device and the receiver computing device to indicate that the communications session and, hence, the virtual try-on session have been terminated. In some embodiments, the virtual try-on session application of the caller computing device may terminate the communications session and the virtual try-on session itself, without need to interact with the virtual try-on service 806.

In response to obtaining a notification indicating that the communications session and virtual try-on session have been terminated, the virtual try-on session application of the receiver computing device may update the receiver user interface 804 to indicate that the communications session and virtual try-on session have been terminated. For example, as illustrated in FIG. 8, the virtual try-on session application may update the receiver user interface 804 to present a dialog box 812 that indicates that the virtual try-on session and communications session with the caller have been terminated. The receiver may subsequently terminate the virtual try-on session application. A similar notification may be presented to the caller via the caller user interface 802 once the virtual try-on session and the communications session with the receiver have been terminated. In some embodiments, in response to termination of the virtual try-on session and the communications session, the virtual try-on session application of the caller computing device and of the receiver computing device may automatically terminate.

Figure 9:
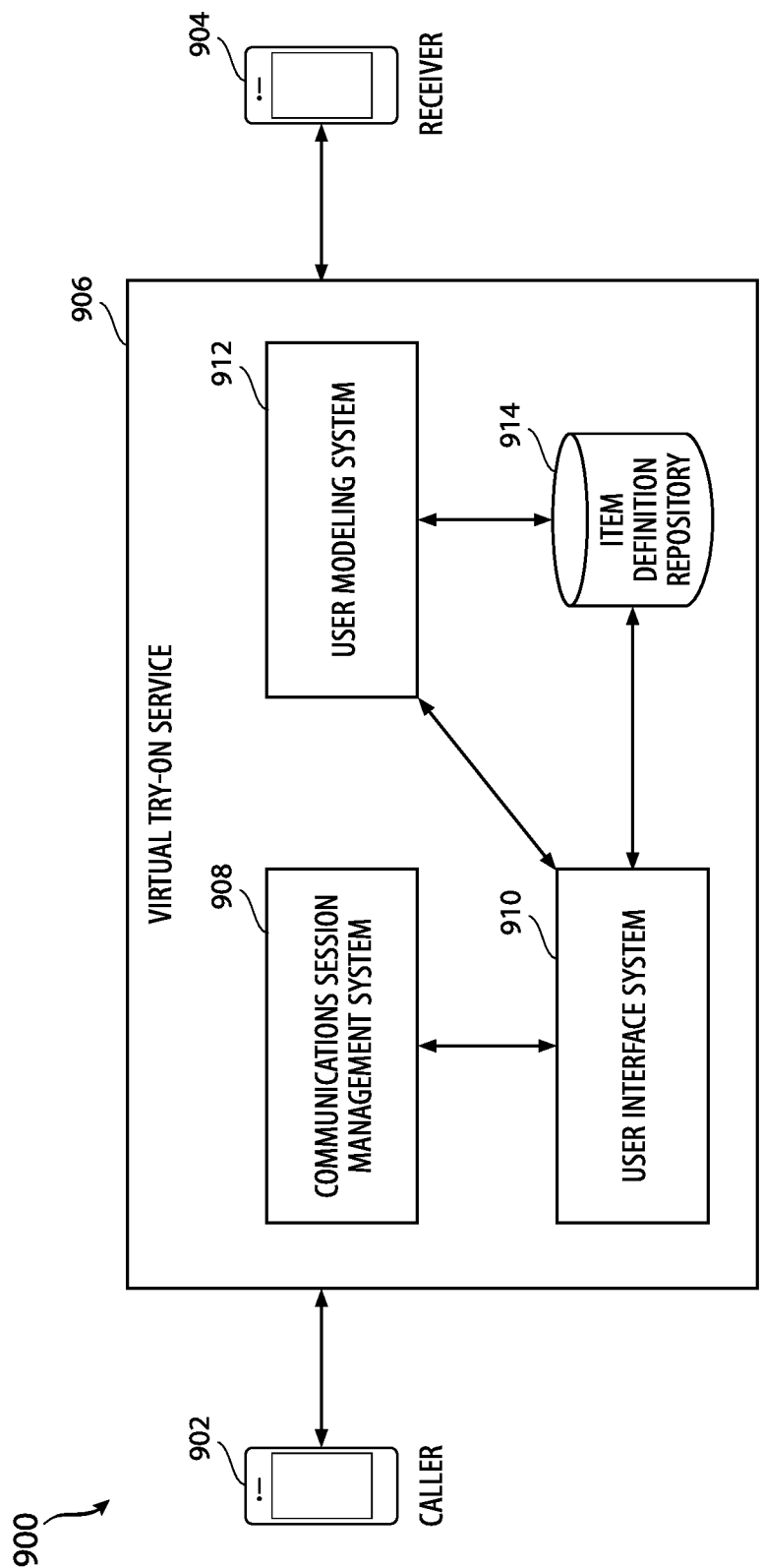
FIG. 9 shows an illustrative example of an environment in which various embodiments can be implemented.

FIG. 9 shows an illustrative example of an environment 900 in which various embodiments can be implemented. In the environment 900, a caller computing device 902 submits a request to a virtual try-on service 906 to establish a communications session with a receiver computing device 904 in order to initiate a virtual try-on session between the caller computing device 902 and the receiver computing device 904. The request from the caller computing device 902 may specify contact information for the receiver computing device 904 or a user associated with the receiver computing device 904. For instance, this contact information may include, but not limited to, a phone number assigned to the receiver computing device 904, an IP address of the receiver computing device 904, an e-mail address of a user of the receiver computing device 904, a username of the user of the receiver computing device 904, and the like.

The request from the caller computing device 902 may be processed by a communications session management system 908 of the virtual try-on service 906. The communications session management system 908 may include one or more computer systems of the virtual try-on service 906, one or more applications or processes operating on computing devices of the virtual try-on service 906, or a stand-alone service in electrical communication with the virtual try-on service 906 configured to perform the operations described herein. The communications session management system 908, in response to the request from the caller computing device 902, may transmit a request to the receiver computing device 904 to determine whether the receiver wishes to partake in the communications session with the caller for the virtual try-on session. For instance, the communications session management system 908 may transmit a notification to the virtual try-on session application of the receiver computing device 904 to ping the receiver with regard to the incoming request from the caller to initiate the virtual try-on session with the receiver. If the receiver indicates, via the receiver computing device 904, that it accepts the caller's request to initiate the virtual try-on session, the communications session management system 908 may establish the communications session between the caller computing device 902 and receiver computing device 904.

In an embodiment, the virtual try-on service 906 includes a user interface system 910, which provides user interface elements for presentation via the caller user interface and the receiver user interface to support the virtual try-on session. The user interface system 910 may obtain, from an item definition repository 914, data corresponding to one or more items that may be graphically represented on a graphical representation of the caller during the virtual try-on session. This data may include three-dimensional models of items, images usable to generate graphical representations of items, metadata specifying classifications or other characteristics of the items, and the like. The user interface system 910 may provide this data to the communications session management system 908, which may propagate the data to the caller computing device 902 and to the receiver computing device 904 for use during the virtual try-on session. For instance, the virtual try-on session application on the caller computing device 902 may use this data to populate a selection pane with graphical representations of items that may be presented via the caller user interface and on to a caller graphical representation.

In an embodiment, the user interface system 910 interacts with a user modeling system 912 to enable accurate graphical representation of the items on to the caller graphical representation presented via the user interfaces of the caller computing device 902 and the receiver computing device 904. For instance, the user modeling system 912 may obtain, from the caller computing device 902, a set of images of the caller captured using a camera of the caller computing device 902 during the virtual try-on session. Using these images, the user modeling system 912 may generate a three-dimensional model of the caller, which may be used to scale and orient graphical representations of items on to the caller graphical representation. The user interface system 910, thus, may use this three-dimensional model, along with inputs from the caller computing device 902 and receiver computing device 904 (e.g., item selections, updated user images detailing changes in orientation, etc.) to determine how a graphical representation of an item is to be presented on the graphical representation of the caller. The user interface system 910 may update both user interfaces of the caller computing device 902 and receiver computing device 904 simultaneously such that presentation of an item graphical representation or any other feature (e.g., feedback, comments, alternative item graphical representations, etc.) is performed simultaneously on both computing devices 902, 904.

Figure 10:
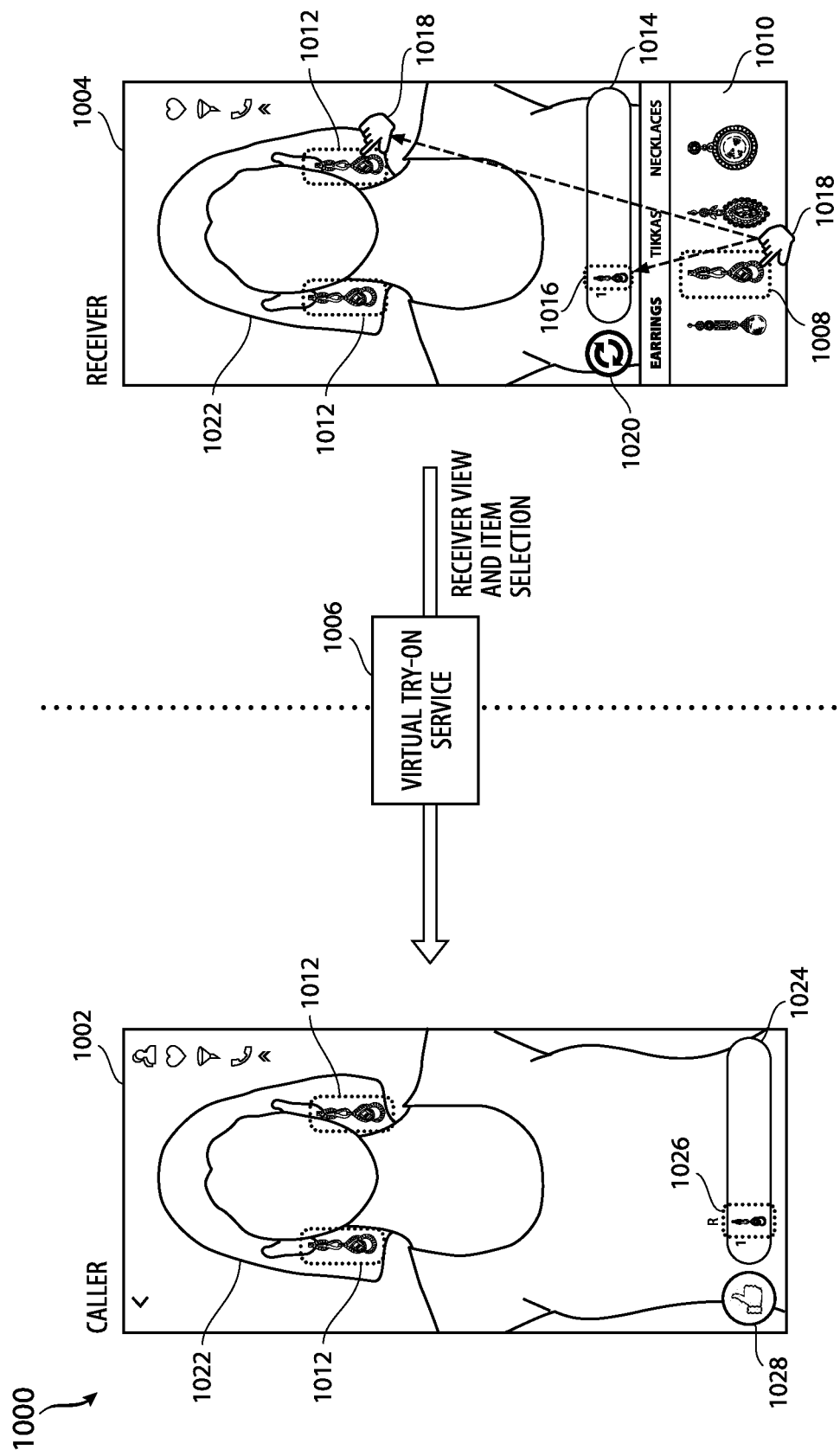
FIG. 10 shows an illustrative example of an environment in which a graphical representation of a receiver is presented simultaneously on a caller user interface and receiver user interface in response to a request from the receiver in accordance with at least one embodiment.

FIG. 10 shows an illustrative example of an environment 1000 in which a receiver graphical representation 1022 is presented simultaneously on a caller user interface 1002 and receiver user interface 1004 in response to a request from the receiver in accordance with at least one embodiment. In the environment 1000, a receiver may select, using a cursor 1018 or other selection mechanism, a reverse view button 1020 presented on the receiver user interface 1004 to cause a receiver graphical representation 1022 to be simultaneously presented on the receiver user interface 1004 and caller user interface 1002 to enable a virtual try-on session for the receiver. In an embodiment, selection of the reverse view button 1020 causes the virtual try-on session application of the receiver computing device to access one or more peripheral devices of the receiver computing device (e.g., cameras, lighting elements, etc.) to initiate a live video feed of the receiver. Further, the virtual try-on session application may replace the caller graphical representation with the receiver graphical representation 1022 generated via the live video feed.

In an embodiment, through the receiver user interface 1004, a receiver can select an item to be graphically represented on to the receiver graphical representation 1022. For instance, in response to selection of the reverse view button 1020, the receiver user interface 1004 may be updated to include a selection pane 1010, through which a selection of items that may be graphically represented on to the receiver graphical representation 1022 may be presented. Using a cursor 1018 or other selection mechanism, the receiver may select, from the selection pane 1010, an item, resulting in a selection 1008. Using the cursor 1018 or other selection mechanism, the receiver may drag the selection 1008 on to an element of the receiver graphical representation 1022 to create an item graphical representation 1012 on the element.

Similar to the operations described above in connection with FIG. 3, the virtual try-on session application may transmit, to the virtual try-on service 1006, information corresponding to the receiver's selection and placement of an item graphical representation 1012 on to the receiver graphical representation 1022. The information may include an identifier of the selected item, as well as position information that may be used to reproduce the item graphical representation 1012 on the caller user interface 1002. In an alternative example, the virtual try-on session application of the receiver computing device may transmit the selection information directly to the caller computing device over the communications session to cause the caller computing device, through its virtual try-on session application, to simultaneously reproduce the item graphical representation 1012 on to the receiver graphical representation 1022.

In an embodiment, the virtual try-on session application of the receiver computing device resets the item ordering pane 1014 presented via the receiver user interface 1004 to specify an ordering of item graphical representations added to the receiver graphical representation 1022. A previous ordering corresponding to item graphical representations added to a caller graphical representation may be stored by the virtual try-on session application such that, if the caller opts to change the view presented via the user interfaces 1002, 1004 to correspond with a caller try-on session, this previous ordering may be retrieved and used to place item graphical representations on to a new caller graphical representation.

As noted above, the item ordering pane 1014 may be used to present an ordering of items previous selected by the receiver and/or by the caller during the virtual try-on session. For instance, when the receiver drags the selection 1008 on to an element of the receiver graphical representation 1022 to create an item graphical representation 1012 on the element, the virtual try-on session application may generate the second item graphical representation 1016 and add this second item graphical representation 1016 to the item ordering pane 1014.

Similar to the operations described above in connection with FIG. 3, when the item graphical representation 1012 is reproduced on the caller user interface 1002, the virtual try-on session application of the caller computing device may add a second item graphical representation 1026 to an item ordering pane 1024 presented on the caller user interface 1002. The second item graphical representation 1026 presented within the item ordering pane 1024 may include additional and/or alternative elements compared to the second item graphical representation 1016 presented through the receiver user interface 1004. For instance, the second item graphical representation 1026 may include an icon or other indicator that the selection of this item was made by the receiver (e.g., "R" to denote that the item was selected by the receiver, etc.).

In an embodiment, the virtual try-on session application of the caller computing device further updates the caller user interface 1002 to present a feedback button 1028. The caller, via the caller user interface, may select the feedback button 1028 to provide feedback corresponding to the receiver's selection of the item graphically represented on the receiver graphical representation 1022. Selection of the feedback button may cause the virtual try-on session application to update the caller user interface 1002 to present a feedback selection pane such as feedback selection pane 728 described above in connection with FIG. 7.

Figure 11:
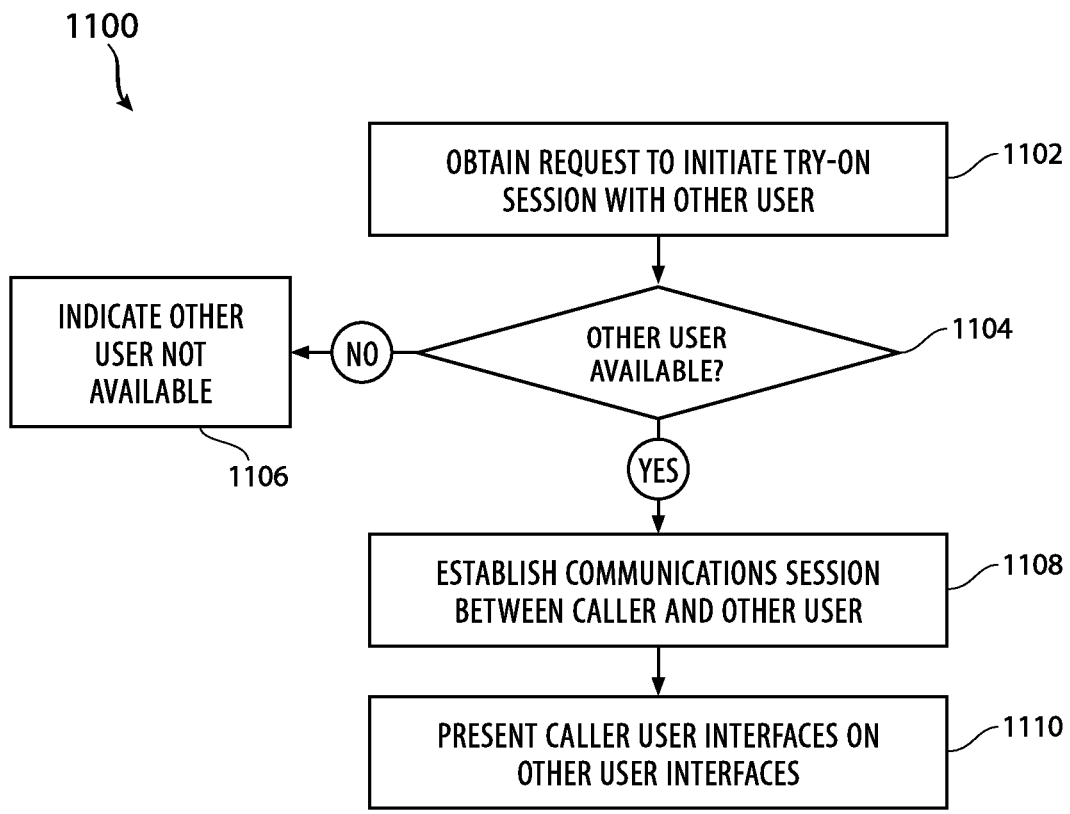
FIG. 11 shows an illustrative example of a process for establishing a communications session between a caller and a receiver in order to initiate a co-operative virtual try-on session in accordance with at least one embodiment.

FIG. 11 shows an illustrative example of a process 1100 for establishing a communications session between a caller computing device and a receiver computing device in order to initiate a co-operative virtual try-on session in accordance with at least one embodiment. The process 1100 may be performed by either a virtual try-on session application installed on a caller computing device or a virtual try-on service that may be accessible to the caller computing device. For instance, the process 1100 may be performed by a virtual try-on session application, which may obtain inputs from a caller or other user of the caller computing device, to initiate a virtual try-on session with a receiver selected from a contacts list or otherwise identified by the caller or other user. Alternatively, the process 1100 may be performed by the virtual try-on service, which may obtain a request from the virtual try-on session application, via the caller computing device, to initiate the virtual try-on session.

In an embodiment, a virtual try-on session application or virtual try-on service obtains 1102 a request to initiate a virtual try-on session with another user (e.g., receiver). The request may specify contact information of this other user including, but not limited to, an e-mail address of the other user, an IP address of a computing device of the other user, a telephone number of the other user, and the like. This contact information may be used by either the virtual try-on session application or virtual try-on service to contact the other user to initiate the virtual try-on session. For instance, the virtual try-on session application or virtual try-on service may transmit, using the provided contact information, a notification to the receiver computing device to determine whether the receiver wishes to engage in the virtual try-on session with the caller.

The virtual try-on session application or virtual try-on service may determine 1104 whether the other user is available to participate in the virtual try-on session. If the receiver indicates that it does not want to partake in the virtual try-on session or the receiver computing device cannot be reached (e.g., receiver computing device is offline, turned off, disabled, etc.), the virtual try-on session application or virtual try-on service may determine that the other user is not available. This may cause the virtual try-on service application or virtual try-on service to indicate 1106 that this other user is not available. For instance, the virtual try-on session application may update the caller user interface to indicate that the virtual try-on session with the other user could not be established. In one example, the try-on session could be not simultaneous or live, but could occur via a text session, email session or other session in which the caller send a communication with an image of them trying on earrings, for example. The recipient can be presented with an interface to review and suggest a comment, suggest other items, provide feedback and so forth, and will send back a response. These communications can be similar to taking snapshot of the live session and do an asynchronous communication of the important snapshots so that the session can still occur, just not simultaneously.

In an embodiment, if the other user is available for the virtual try-on session, the virtual try-on session application or virtual try-on service establishes 1108 a communications session between the caller computing device and the computing device of the other user. Through this communications session, a live video feed of the caller may be streamed to the computing device of the other user to cause the live video feed to be presented on a user interface of the other user's computing device. Further, through the virtual try-on service, data corresponding to the various items that may be graphically represented on to a caller graphical representation or other graphical representation of an individual may be provided to both the caller computing device and the other user's computing device. This may cause the virtual try-on session application installed on both computing devices to present this data to their respective users (e.g., selection pane with item graphical representations, etc.). Thus, once the communications session has been established, the virtual try-on session application or the virtual try-on service may simultaneously present the caller graphical representation on both computing devices. Again, the session could also be established via a website. The devices could also connect directly via a wireless link.

Figure 12:
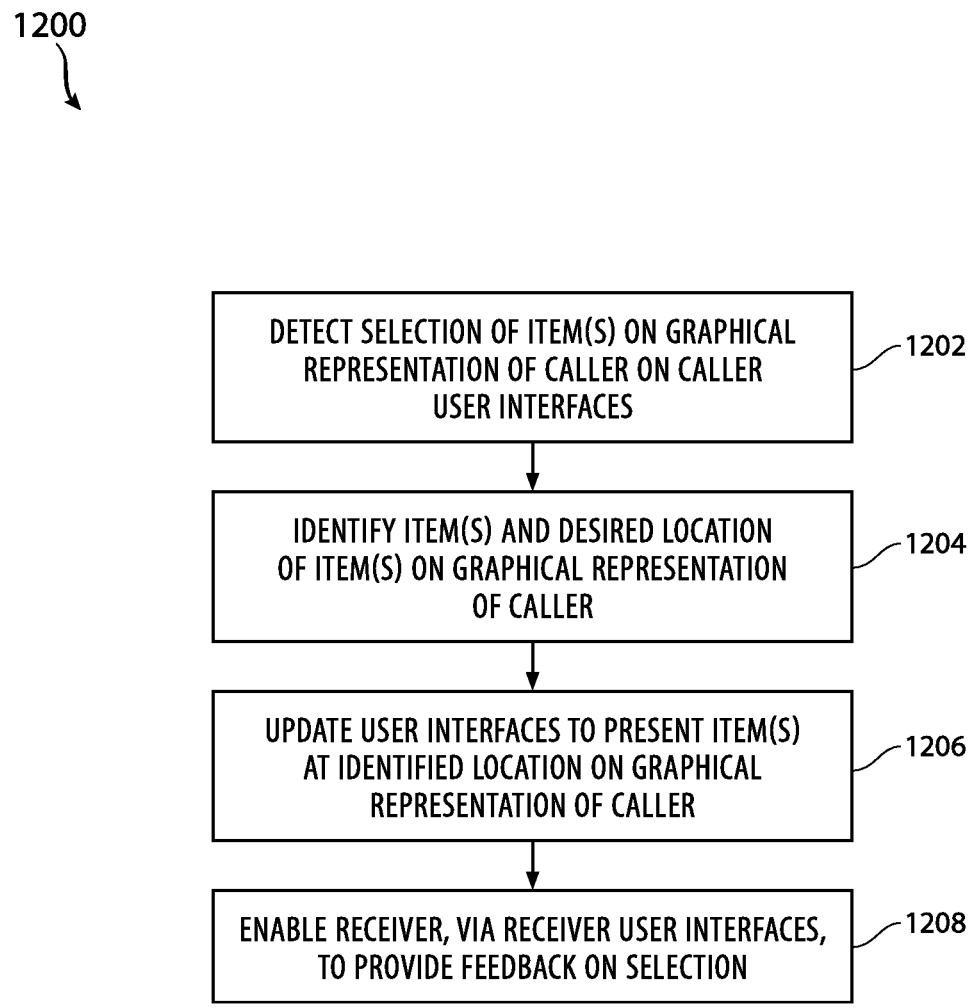
FIG. 12 shows an illustrative example of a process for simultaneously updating a caller user interface and a receiver user interface in response to detecting selection and presentation of items on a graphical representation of the caller in accordance with at least one embodiment.

FIG. 12 shows an illustrative example of a process 1200 for simultaneously updating a caller user interface and a receiver user interface in response to detecting selection and presentation of items on a graphical representation of the caller in accordance with at least one embodiment. The process 1200 may be performed by a virtual try-on service or by the virtual try-on session application of the caller computing device that may be connected, via the communications session, with the receiver computing device. In an embodiment, the virtual try-on service or virtual try-on session application detects 1202 selection and presentation of one or more items on a caller graphical represented on the caller user interface. As described above, the caller may select, from a selection pane presented via the caller user interface, a graphical representation of an item that the caller wishes to graphically represent on a particular portion of the caller graphical representation (e.g., an earring on the ears of the caller, etc.). Using a cursor or other selection mechanism, the caller may drag and drop the graphical representation of the item onto the selected portion of the caller graphical representation on the caller user interface.

Based on the caller's selection of the items that are to be presented on the graphical representation of the caller, the virtual try-on service or virtual try-on session application may identify 1204 the items and the desired location of these items on the graphical representation of the caller. For instance, based on the caller's interaction with the caller user interface to place the graphical representation of the item on to the caller graphical representation, the virtual try-on service or virtual try-on session application may identify a body feature of the caller on which the graphical representation of the item is to be placed. For instance, if the caller places the item graphical representation on to a graphical representation of the caller's ear, the virtual try-on service or virtual try-on session application may determine that the item graphical representation is to be positioned on the graphical representation of the caller's ears presented on both the caller computing device and receiver calling device. In an embodiment, if the selected item graphical representation is assigned a particular classification corresponding to a body feature of the caller, the virtual try-on service or virtual try-on session application can determine that the item graphical representation is to be placed on the graphical representation of this particular body feature.

The virtual try-on service or virtual try-on session application may transmit, to the receiver computing device, data corresponding to the selected item and location for placement of the graphical representation of the item to update 1206 the receiver user interface by placing the graphical representation of the item on to the graphical representation of the caller presented on the receiver user interface. In an embodiment, the placement of the item graphical representation is performed simultaneously on both the caller user interface and receiver user interface. For instance, as the caller releases the cursor other selection mechanism at the desired location for the item graphical representation, the virtual try-on service or virtual try-on session application may transmit the data corresponding to the selected item and the location for placement of the item graphical representation to the receiver computing device. Thus, as the item graphical representation is generated on the caller graphical representation on the caller user interface, it is also being generated on the caller graphical representation on the receiver user interface.

Once the user interfaces have been updated to present the item graphical representation on to the caller graphical representation, the virtual try-on service or virtual try-on session application may enable 1208 the receiver, via the receiver user interface, to provide feedback with regard to the caller selection of the item. For instance, the receiver user interface may be updated to include a feedback button that, if selected, results in presentation of a feedback selection pane. Through this feedback selection pane, the receiver may select an emoji to denote the receiver's opinion of the caller's item selection. In some instances, through the feedback selection pane, the receiver may provide more detailed feedback (e.g., a statement, an audio recording, a video recording, etc.) with regard to the caller's item selection.

Figure 13:
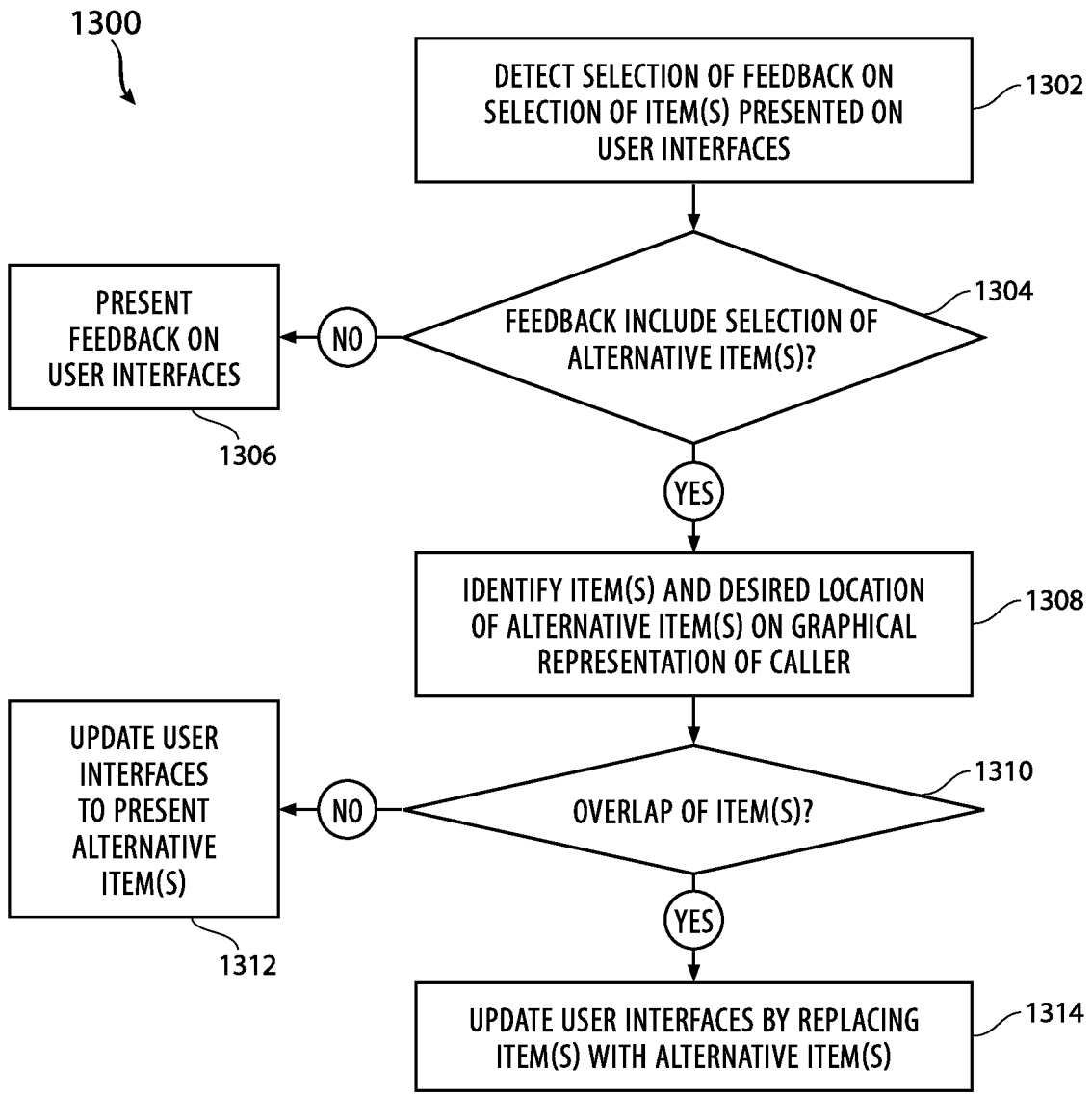
FIG. 13 shows an illustrative example of a process for simultaneously updating a caller user interface and a receiver user interface in response to detecting feedback on a selection of items presented on the user interfaces in accordance with at least one embodiment.

FIG. 13 shows an illustrative example of a process 1300 for simultaneously updating a caller user interface and a receiver user interface in response to detecting feedback on a selection of items presented on the user interfaces in accordance with at least one embodiment. The process 1300 may be performed by the virtual try-on service or by the virtual try-on session application installed on the receiver computing device, through which a receiver may provide feedback in response to a caller selection of an item graphically represented on a caller graphical representation. In an embodiment, the virtual try-on service or virtual try-on session application of the receiver computing device detects 1302 feedback with regard to the selection of one or more items graphical represented on a caller graphical representation. As noted above, the receiver may select, from a feedback selection pane presented via the receiver user interface, an emoji corresponding to the receiver's opinion of the caller's item selection. Alternatively, the receiver may provide, via the receiver user interface, one or more statements regarding the receiver's opinion of the caller's item selection. The feedback may also include an audio and/or visual recording of the receiver's opinion. In an embodiment, the receiver can additionally, or alternatively, select, via a selection pane presented via the receiver user interface, an alternative item to be graphically represented on the caller graphical representation.

The virtual try-on service or virtual try-on session application may evaluate the provided feedback to determine 1304 whether this feedback includes selection of one or more alternatives that are to be graphically represented on the caller graphical representation on both the receiver user interface and caller user interface. Absent selection of any alternative items, the virtual try-on service or virtual try-on session application may present 1306 the provided feedback on the caller user interface and the receiver user interface simultaneously. This may include updating the item ordering pane presented on both user interfaces to display the receiver's feedback in conjunction with a graphical representation of the item.

In an embodiment, if the provided feedback includes selection of one or more items to be graphically represented on the caller graphical representation on both the caller user interface and the receiver user interface, the virtual try-on service or virtual try-on session application identifies these one or more items and the location where graphical representations of these one or more items are to be placed on the caller graphical representation. The performance of this operation may be similar to that of operation 1204 described above in connection with FIG. 12.

Based on the proposed location for the graphical representations of these one or more items, the virtual try-on service or virtual try-on session application may determine 1310 whether the graphical representations of these one or more items would overlap with other graphical representations of items currently presented on the caller graphical representation. If the graphical representations of the one or more items selected by the receiver would not overlap any other existing item graphical representations presented on the caller graphical representation, the virtual try-on service or virtual try-on session application may simultaneously update 1312 the receiver user interface and the caller user interface to present graphical representations of these alternative items. The operation 1312 may be similar to the operation 1206 described above in connection with FIG. 12. If the graphical representations of the one or more alternative items would overlap existing item graphical representations, the virtual try-on service or virtual try-on session application may simultaneously update 1314 the caller user interface and the receiver user interface by replacing the existing item graphical representations with the graphical representations of the one or more alternative items selected by the receiver.

Figure 14:
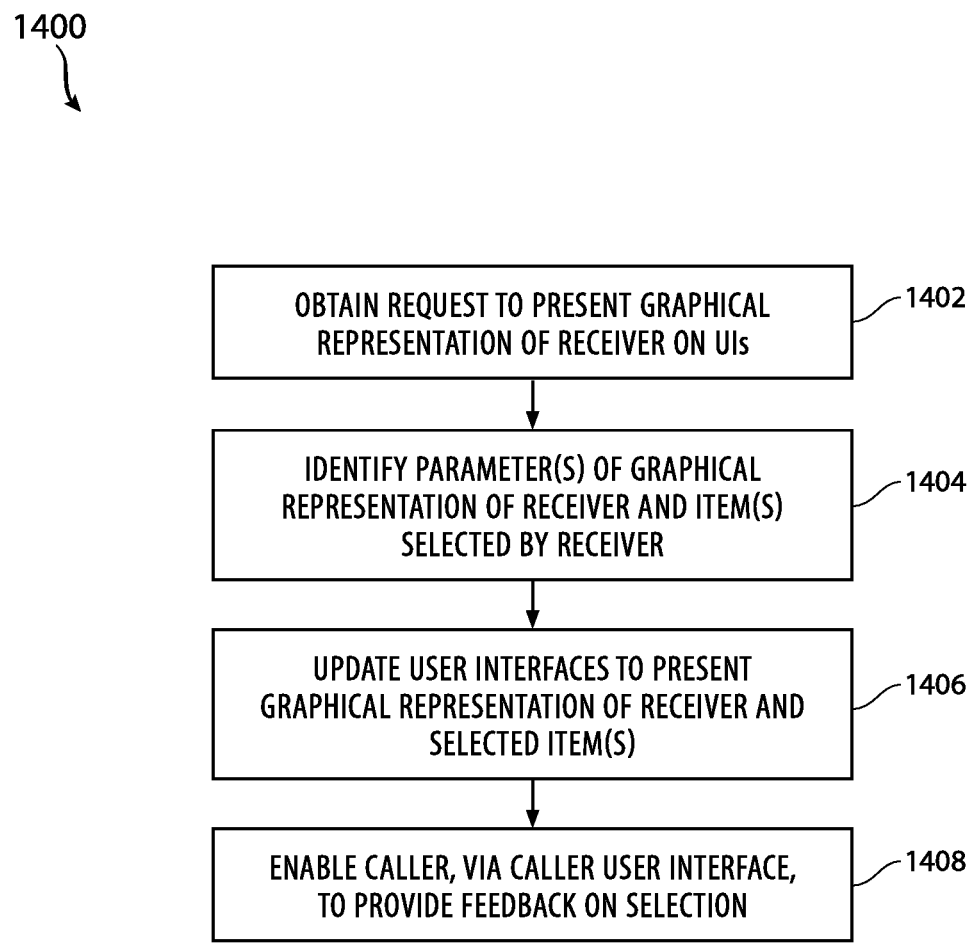
FIG. 14 shows an illustrative example of a process for simultaneously presenting a graphical representation of a receiver on a caller user interface and a receiver user interface in response to a request in accordance with at least one embodiment.

FIG. 14 shows an illustrative example of a process 1400 for simultaneously presenting a graphical representation of a receiver on a caller user interface and a receiver user interface in response to a request in accordance with at least one embodiment. The process 1400 may be performed by the virtual try-on service or a virtual try-on session application executing on a receiver computing device. As noted above, the receiver user interface may include a reverse view button that may be used to cause a receiver graphical representation to be simultaneously presented on the receiver user interface and caller user interface to enable a virtual try-on session for the receiver. Thus, if the receiver selects this reverse view button, the virtual try-on session application or virtual try-on service may obtain 1402 a request to present a receiver graphical representation on the caller user interface and receiver user interface. In an embodiment, selection of the reverse view button causes the virtual try-on session application of the receiver computing device or the virtual try-on service to access one or more peripheral devices of the receiver computing device (e.g., cameras, lighting elements, etc.) to initiate a live video feed of the receiver.

In response to the request, the virtual try-on service or virtual try-on session application may perform operations similar to those described in above in connection with FIG. 12. For instance, the virtual try-on service or virtual try-on session application may identify 1404 one or more parameters of the receiver graphical representation to be presented and of the one or more items that may have been selected by the receiver. This may include identifying the position and orientation of the receiver based on the live video feed of the receiver computing device, determining what (if any) items have been selected by the receiver for presentation on the receiver graphical representation, and the like. Once these parameters have been identified, the virtual try-on service or virtual try-on session application may simultaneously update 1406 the caller user interface and the receiver user interface to present the receiver graphical representation along with any graphical representations of items selected by the receiver. Further, the virtual try-on service or virtual try-on session application may enable 1408 the caller, via the caller user interface, to provide feedback on the selection of items made by the receiver.

Figure 15:
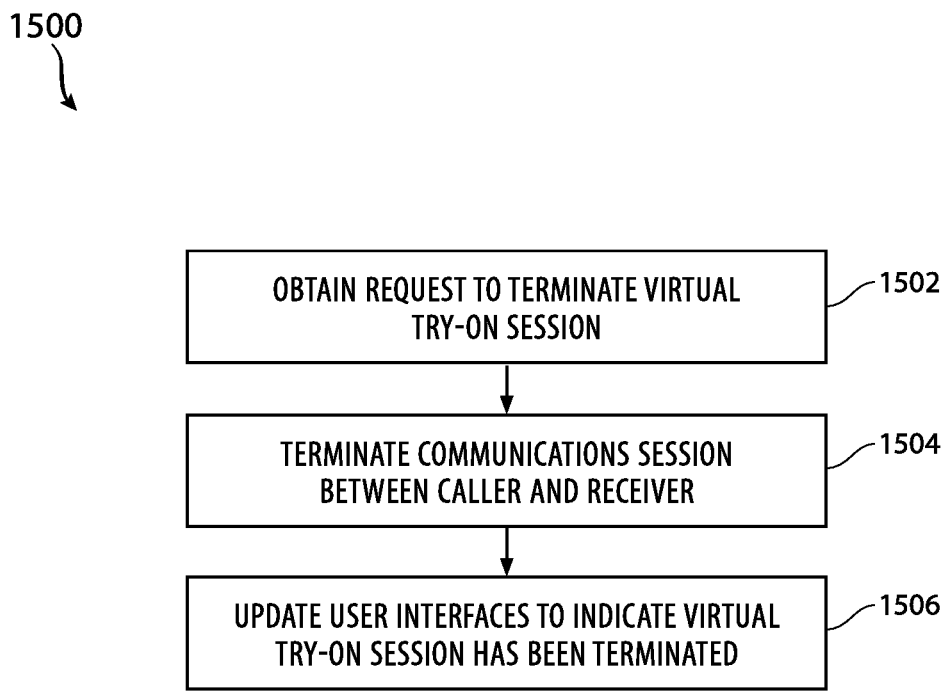
FIG. 15 shows an illustrative example of a process for terminating a communications session between a caller and a receiver in accordance with at least one embodiment.

FIG. 15 shows an illustrative example of a process 1500 for terminating a communications session between a caller and a receiver in accordance with at least one embodiment. The process 1500 may be performed by the virtual try-on service or any of the virtual try-on session applications installed on the caller computing device and receiver computing device. At any time, a participant (e.g., caller or receiver) of a virtual try-on session may seek to terminate the virtual try-on session. For instance, a user may select, from a session control pane presented on a user interface of the user's computing device, a button to request termination of the virtual try-on session. Thus, if the user selects a button from the user interface to request termination of the virtual try-on session, the virtual try-on service or virtual try-on session application installed on the user's computing device may obtain 1502 this request and terminate 1504 the communications session between the user's computing device and the computing device of another user participating in the virtual try-on session. Once the communications session has been terminated, the virtual try-on service or the virtual try-on service applications of both computing devices may simultaneously update 1506 the user interfaces of both users to indicate that the virtual try-on session has been terminated.

Figure 16:
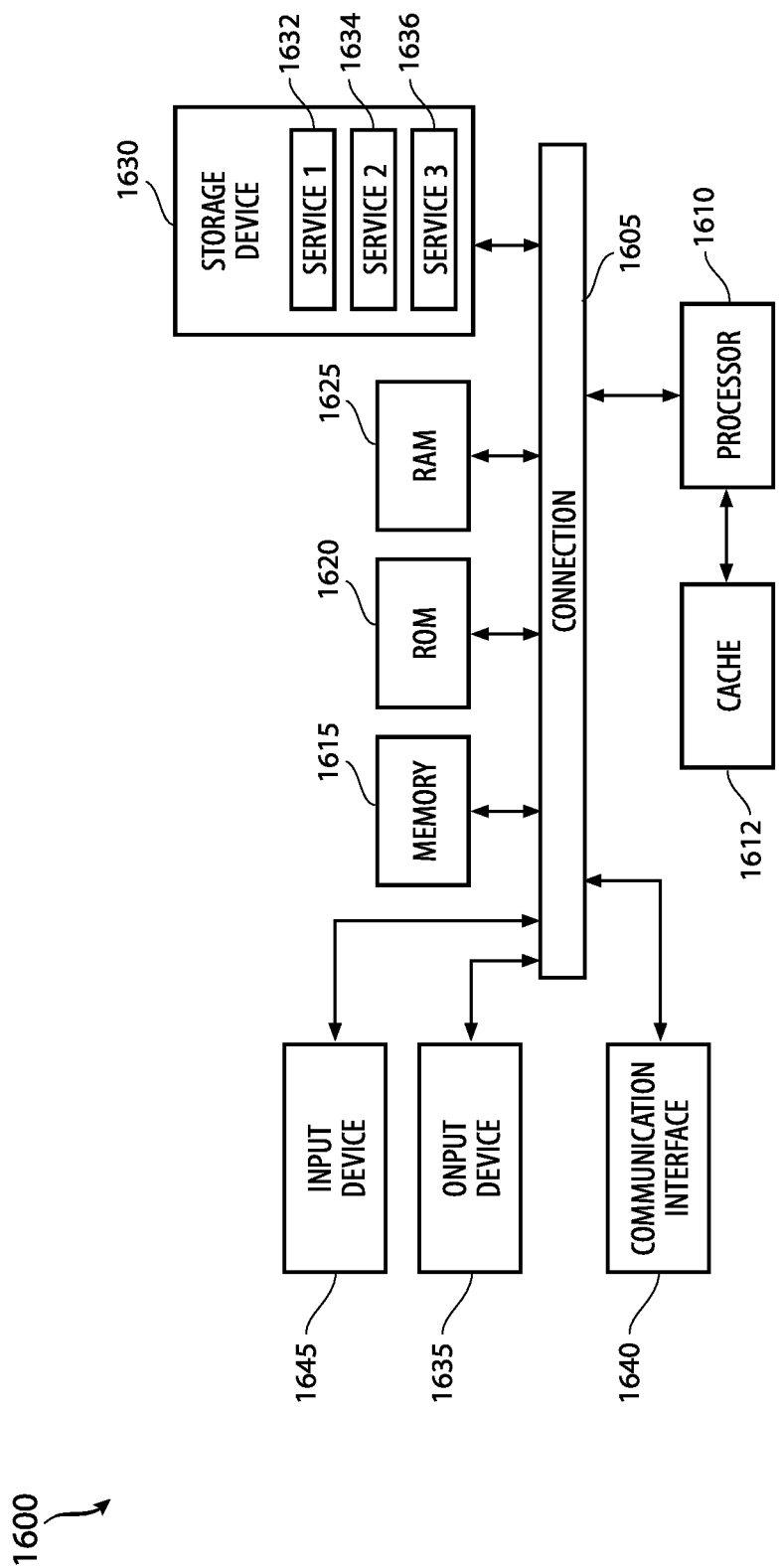
FIG. 16 shows an illustrative example of a computing system architecture including various components in electrical communication with each other using a connection in accordance with various embodiments.

FIG. 16 shows an illustrative example of a computing system architecture including various components in electrical communication with each other using a connection in accordance with various embodiments. In this example, FIG. 16 illustrates a computing system 1600 (system 1600) including components in electrical communication with each other using a connection 1605, such as a bus. System 1600 includes a processing unit (CPU or processor) 1610 and a system connection 1605 that couples various system components including the system memory 1615, such as read only memory (ROM) 1620 and random access memory (RAM) 1625, to the processor 1610. The system 1600 can include a cache of high-speed memory connected directly with, in close proximity to, or integrated as part of the processor 1610. The system 1600 can copy data from the memory 1615 and/or the storage device 1630 to the cache 1612 for quick access by the processor 1610. In this way, the cache can provide a performance boost that avoids processor 1610 delays while waiting for data. These and other modules can control or be configured to control the processor 1610 to perform various actions. Other system memory 1615 may be available for use as well. The memory 1615 can include multiple different types of memory with different performance characteristics. The processor 1610 can include any general purpose processor and a hardware or software service, such as service 1 1632, service 2 1634, and service 3 1636 stored in storage device 1630, configured to control the processor 1610 as well as a special-purpose processor where software instructions are incorporated into the actual processor design. The processor 1610 may be a completely self-contained computing system, containing multiple cores or processors, a bus, memory controller, cache, etc. A multi-core processor may be symmetric or asymmetric.

To enable user interaction with the device 1600, an input device 1645 can represent any number of input mechanisms, such as a microphone for speech, a touch-sensitive screen for gesture or graphical input, keyboard, mouse, motion input, speech and so forth. An output device 1635 can also be one or more of a number of output mechanisms known to those of skill in the art. In some instances, multimodal systems can enable a user to provide multiple types of input to communicate with the device 1600. The communications interface 1640 can generally govern and manage the user input and system output. There is no restriction on operating on any particular hardware arrangement and therefore the basic features here may easily be substituted for improved hardware or firmware arrangements as they are developed.

Storage device 1630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1625, read only memory (ROM) 1620, and hybrids thereof.

The storage device 1630 can include services 1632, 1634, 1636 for controlling the processor 1610. Other hardware or software modules are contemplated. The storage device 1630 can be connected to the system connection 1605. In one aspect, a hardware module that performs a particular function can include the software component stored in a computer-readable medium in connection with the necessary hardware components, such as the processor 1610, connection 1605, output device 1635, and so forth, to carry out the function.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se. In one example, using a protocol such as Bluetooth, the two devices may communicate directly with each other to manage the try-on session.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The system as disclosed above can be a special purpose computer or multiple computers operating to provide or implement the algorithms or processes described herein to create the virtual try-on multi-person/device experience. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method, comprising:
   obtaining, from a first computing device, a request to establish a communication session between the first computing device and a second computing device to initiate a virtual try-on session for a first user of the first computing device;
   establishing the communication session between the first computing device and the second computing device, the communication session configured to enable the virtual try-on session of the first user to be simultaneously viewed on a first computing device user interface and a second computing device user interface, and the communication session comprising a live video feed of the first user;

receiving, from the first computing device, a selection of one or more items to be presented on a graphical representation of the first user;

updating the first computing device user interface and the second computing device user interface to both simultaneously present the one or more items on the graphical representation of the first user;

obtaining, from the second computing device, feedback on the one or more items from a second user, wherein the feedback comprises a selection of another item; and updating the first computing device user interface and the second computing device user interface to make the another item visible on the graphical representation of the first user such that the another item is superimposed on the live video feed and affixed to a body part of the first user identified based on an evaluation, by a computer, of the graphical representation of the first user.

2. The method of claim 1, wherein:

the feedback comprises an emoji; and updating the first computing device user interface and the second computing device user interface in accordance with the feedback comprises presenting, via the first computing device user interface and the second computing device user interface, the emoji.

3. The method of claim 1, wherein the live video feed further comprises the second user trying on the another item such that the another item is superimposed on the live video feed and affixed to a body part of the second user based on a second evaluation, by the computer, of a graphical representation of the second user.

4. The method of claim 1, wherein:

obtaining, from the first computing device, second feedback on the another item from the first user; and updating the first computing device user interface and the second computing device user interface in accordance with the second feedback.

5. The method of claim 1, further comprising:

receiving a request to terminate the communication session between the first computing device and the second computing device;

terminating the communication session; and updating the first computing device user interface and the second computing device user interface to indicate that the communication session has been terminated.

6. The method of claim 1, wherein updating the first computing device user interface and the second computing device user interface in accordance with the feedback comprises presenting, via the first computing device user interface and the second computing device user interface, an indication that the feedback was generated by the second user.

7. A system, comprising:

one or more processors; and memory storing thereon executable instructions that, as a result of being executed by the one or more processors, cause the one or more processors to:

obtain, from a first computing device, a request to initiate a communication session between the first computing device and a second computing device to initiate a virtual try-on session for a first user of the first computing device, and the communication session comprising a live video feed of the first user;

establish the communication session, the communication session configured to enable the virtual try-on session to be simultaneously viewed on a first computing device user interface and a second computing device user interface;

receive, from the first computing device, a selection of one or more items to be presented on a graphical representation of the first user;

update the first computing device user interface and a second computing device user interface to both simultaneously present the one or more items on the graphical representation of the first user;

obtain, from the second computing device, feedback associated with the one or more items from a second user, wherein the feedback comprises a selection of another item; and in response to obtaining the feedback, update the first computing device user interface and the second computing device user interface to present the feedback to make the another item visible on the graphical representation of the first user such that the another item is superimposed on the live video feed and affixed to a body part of the first user identified based on an evaluation, by a computer, of the graphical representation of the first user.

8. The system of claim 7, wherein the live video feed further comprises the second user trying on the another item such that the another item is superimposed on the live video feed and affixed to a body part of the second user based on a second evaluation, by the computer, of a graphical representation of the second user.

9. The system of claim 7, wherein presenting, via the first computing device user interface and the second computing device user interface, the another item comprises removing at least one of the one or more items from the graphical representation of the first user.

10. The system of claim 7, wherein:

the feedback comprises an emoji; and updating the first computing device user interface and the second computing device user interface to present the feedback further comprises presenting, via the first computing device user interface and the second computing device user interface, the emoji on a portion of a selection pane of the first computing device user interface and of the second computing device user interface corresponding to the one or more items.

11. The system of claim 7, wherein the executable instructions further cause the one or more processors to:

obtain, from the first computing device, second feedback corresponding to input obtained from the second computing device over the communication session; and update the first computing device user interface and the second computing device user interface in accordance with the second feedback.

12. The system of claim 7, wherein the live video feed is extended to more users than the first user and the second user in a single co-shopping session.

13. A non-transitory computer-readable storage medium storing thereon executable instructions that, as a result of being executed by one or more processors of a computer system, cause the computer system to:

obtain, from a first computing device, a request to establish a communication session between the first computing device and a second computing device to initiate a virtual try-on session for a first user of the first computing device, and the communication session comprising a live video feed of the first user;

establish the communication session, the communication session configured to enable the virtual try-on session of the first user to be simultaneously viewed on a first computing device user interface and a second computing device user interface;

receive, from the first computing device, selection of one or more items to be presented on a graphical representation of the first user;

update the first computing device user interface and a second computing device user interface to present the one or more items on the graphical representation of the first user;

obtain, from the second computing device, feedback corresponding to the one or more items from a second user, wherein the feedback comprises a selection of another item; and update the first computing device user interface and a second computing device user interface to make the another item visible on the graphical representation of the first user such that the another item is superimposed on the live video feed and affixed to a body part of the first user identified based on an evaluation, by a computer, of the graphical representation of the first user.

14. The non-transitory computer-readable storage medium of claim 13, wherein:

the feedback comprises an emoji; and the executable instructions that cause the computer system to update the first computing device user interface and the second computing device user interface to present the feedback further cause the computer system to present the emoji in conjunction with the one or more items via the first computing device user interface and the second computing device user interface.

15. The non-transitory computer-readable storage medium of claim 13, wherein the live video feed further comprises the second user trying on the another item such that the another item is superimposed on the live video feed and affixed to a body part of the second user based on a second evaluation, by the computer, of a graphical representation of the second user.

16. The non-transitory computer-readable storage medium of claim 15, wherein the executable instructions further cause the computer system to update the first computing device user interface and the second computing device user interface to indicate that the another item was selected by the second user.

17. The non-transitory computer-readable storage medium of claim 15, wherein the executable instructions further cause the computer system to replace, via the first computing device user interface and the second computing device user interface, at least one of the one or more items with the another item.

18. The non-transitory computer-readable storage medium of claim 13, wherein the communication session enables audio communications between the first user and the second user.

19. The non-transitory computer-readable storage medium of claim 13, wherein the executable instructions further cause the computer system to:

obtain a second request to terminate the communication session;

in response to the second request, terminate the communication session; and cause a notification to be presented, via the first computing device user interface and the second computing device user interface, to indicate that the communication session is terminated.

20. The non-transitory computer-readable storage medium of claim 13, wherein the executable instructions further cause the computer system to:

obtain, from the first computing device, second feedback corresponding to the feedback provided by the second computing device; and update the first computing device user interface and the second computing device user interface to present the second feedback.

* * * * *